United States Patent

Arkin

(10) Patent No.: US 8,369,346 B2
(45) Date of Patent: Feb. 5, 2013

(54) METHOD AND SYSTEM FOR RESTRICTING A NODE FROM COMMUNICATING WITH OTHER NODES IN A BROADCAST DOMAIN OF AN IP (INTERNET PROTOCOL) NETWORK

(75) Inventor: Ofir Arkin, Carmiel (IL)

(73) Assignee: McAfee, Inc., Santa Clara, CA (US)

( * ) Notice: Subject to any disclaimer, the term of this patent is extended or adjusted under 35 U.S.C. 154(b) by 696 days.

(21) Appl. No.: 12/518,807

(22) PCT Filed: Nov. 7, 2007

(86) PCT No.: PCT/IL2007/001350
§ 371 (c)(1),
(2), (4) Date: Jun. 11, 2009

(87) PCT Pub. No.: WO2008/072220
PCT Pub. Date: Jun. 19, 2008

(65) Prior Publication Data
US 2010/0027551 A1 Feb. 4, 2010

Related U.S. Application Data

(60) Provisional application No. 60/874,273, filed on Dec. 12, 2006.

(51) Int. Cl.
*H04L 12/56* (2006.01)
(52) U.S. Cl. ............... 370/401; 370/465; 709/245
(58) Field of Classification Search ............ None
See application file for complete search history.

(56) References Cited

U.S. PATENT DOCUMENTS

| | | | |
|---|---|---|---|
| 7,124,197 B2 | 10/2006 | Ocepek et al. | |
| 2004/0054926 A1 | 3/2004 | Ocepek et al. | |
| 2004/0153575 A1* | 8/2004 | Coggeshall | 709/245 |
| 2005/0050365 A1 | 3/2005 | Seki et al. | |
| 2007/0008942 A1* | 1/2007 | Ocepek et al. | 370/338 |
| 2007/0064689 A1* | 3/2007 | Shin et al. | 370/389 |
| 2007/0157306 A1* | 7/2007 | Elrod et al. | 726/14 |
| 2007/0192858 A1* | 8/2007 | Lum | 726/22 |

FOREIGN PATENT DOCUMENTS

WO WO 2005/053230 A2 6/2005

OTHER PUBLICATIONS

Arkin et al., "The Present and Future of Xprobe2: The Next Generation of Active Operating System Fingerprinting," 2003.
Tanenbaum et al., "The Address Resolution Protocol," *Computer Networks*, London, England, Jan. 1, 1996, pp. 420-424.
Stevens W R ED, "ARP: Address Resolution Protocol," *TCP/IP Illustrated*, vol. 1, Reading, MA, Jan. 1, 1994, pp. 53-68.

* cited by examiner

*Primary Examiner* — Hassan Phillips
*Assistant Examiner* — Duc Duong
(74) *Attorney, Agent, or Firm* — Wong, Cabello, Lutsch, Rutherford & Brucculeri, LLP

(57) ABSTRACT

Method and system for restricting a first node in a broadcast domain of an IP (Internet Protocol) network from communicating with one or more other nodes. Each of the first node and the one or more other nodes has a respective translation table that maps an IP address to a respective physical address of all nodes with which the first node and the one or more other nodes have communicated. Embodiments of the invention describe obtaining communicated data including address resolution messages and accessing an address resolution table representative of address resolution activity in the network. Responsive to the communicated data indicating that the first node is communicating with other nodes, restricting the first node from communicating by generating and conveying a restricting address resolution message using information stored in the address resolution table, the restricting address resolution message including a substitute physical address.

26 Claims, 12 Drawing Sheets

METHOD AND SYSTEM FOR RESTRICTING A NODE FROM COMMUNICATING WITH OTHER NODES IN A BROADCAST DOMAIN OF AN IP (INTERNET PROTOCOL) NETWORK

This is a National Phase Application of International Application No. PCT/IL2007/001350, filed Nov. 7, 2007, which claims the benefit of U.S. Provisional Application No. 60/874,273, filed Dec. 12, 2006. The disclosures of the prior applications are hereby incorporated by reference herein in their entirety.

FIELD OF THE INVENTION

This invention relates to communication networks. More specifically, the invention relates to security of communication networks and to restricting nodes from communicating with other nodes in a communication network.

BACKGROUND OF THE INVENTION

FIG. 1 is a schematic illustration of IP networks 101, 106 including nodes. The figure illustrates two optional network topologies while those versed in the art will appreciate that many other topologies are possible and hence the illustrated topologies are not limiting. Hereinafter, every physical element connected to the network constitutes a node. The illustrated network 101 constitutes a Local Area Network (LAN), which is connected to the Internet 102 via a router 103. The router 103 can connect directly to end nodes 104, including workstations, such as a personal computer (PC), servers such as UNIX workstations, terminals such as X-terminals etc. Alternatively, the router 103 can connect to one or more hubs 105, to which additional end nodes 104 can connect. It is noted that the hub 105, in this case, is a simple hub (i.e., it is a non-switched hub) and hence the nodes connected thereto are in the same broadcast domain as the end nodes connected to the router 103. Furthermore, those versed in the art would appreciate that a router can have more than one network interface card, connecting it to different networks or portions of networks, hence it should be appreciated that hereinafter (throughout the specification) the router 103 represents one interface, connecting the router to the network 101. It is also noted that routers (such as router 103), hubs (such as hub 105), end nodes 104 and other physical elements including a network interface constitute together "nodes". 106 is another example of an IP network, which includes a switch 107 to which end nodes 104 are connected. It is appreciated that like network 101, network 106 also constitutes one broadcast domain. In addition, those versed in the art would appreciate that it is possible to connect network 106 to the Internet via a router (such as router 103), yet, it was already indicated that the router may have several network interface cards, and indeed in FIG. 1 two such network interface cards exist, one for connecting the router to the network 106 and one for connecting it to the Internet 102. Hence, only the NIC connecting the router to the network 106 is considered to be a member in the broadcast domain and therefore in FIG. 1 it appears that only part of the router is part of the network while another part thereof is external thereto.

There are several network protocols known in the art, which allow different functionalities in a communication network. For example, Request For Comments (RFC) 826 (published in 1982), which is publicly available and incorporated herein by reference, deals with converting protocol addresses (e.g. IP addresses) to local network addresses (e.g., Ethernet addresses), a protocol known as Address Resolution Protocol (ARP).

According to RFC 826, when a packet is sent down through the network layers, routing determines the protocol address of the next hop for the packet and on which piece of hardware it expects to find the station with the immediate target protocol address. In the case of the 10 Mbit Ethernet, address resolution is needed and some lower layer (probably the hardware driver) must consult the Address Resolution module (perhaps implemented in the Ethernet support module) to convert the <protocol type, target protocol address> pair to a 48.bit Ethernet address. The Address Resolution module tries to find this pair in a "translation table" or "ARP cache". If it finds the pair, it gives the corresponding 48.bit Ethernet address back to the caller (hardware driver) which then transmits the packet. If it does not find the pair, it probably informs the caller that it is throwing the packet away (on the assumption the packet will be retransmitted by a higher network layer). It then causes this packet to be broadcast to all stations on the Ethernet cable originally determined by the routing mechanism.

When an address resolution packet is received, the receiving Ethernet module gives the packet to the Address Resolution module, which merges the <protocol type, sender protocol address, sender hardware address> triplet into its local translation table before checking whether it should generate a reply. Note that if an entry already exists for the <protocol type, sender protocol address> pair, then the new hardware address supersedes the old one. Then, if the opcode is a REQUEST and the target protocol address matches the protocol address of the receiving machine, the receiving machine generates a REPLY, transmitting it to the machine that generated the REQUEST. In addition, it is noted that upon communicating with a machine remote to the LAN, it is the router's physical address that is resolved instead of the machine's address.

According to RFC 826, it sometimes happens that a host goes down or moves (e.g., when the protocol address (such as an IP address) is reassigned to a different physical piece of hardware). In order to keep the translation table up-to-date, it is possible to perform timeouts, wherein after a suitable timeout constituting an "ARP-check-timeout", the machine considers removing an entry therefrom. It may send an address resolution packet with opcode REQUEST (i.e., an ARP request) directly to the Ethernet address in the table. If a REPLY (i.e., an ARP reply) is not seen in a short amount of time, the entry is deleted from the translation table.

It should be noted that according to RFC 826, the Address Resolution Protocol and packet format described therein are allowed to be used for non-10 Mbit Ethernets. Therefore, hereinafter, instead of referring to an "Ethernet address", reference is made to a "physical address", which is more general.

It is noted that according to several address resolution protocols, operating systems maintain two different predetermined values for ARP-check-timeout, namely, an in-session-ARP-check-timeout and an out-of-session-ARP-check-timeout, wherein the in-session-ARP-check-timeout is longer than the out-of-session-ARP-check-timeout. For example, Microsoft Windows® operating systems (including, e.g., Microsoft Windows 2000®, Microsoft Windows XP® and Microsoft Windows 2003®) maintain an in-session-ARP-check-timeout of 10 minutes, i.e., these operating systems maintain an entry in their translation table for 10 minutes (while in session) before they send an ARP request to this entry's respective target node and before they remove the entry from the translation table. If no session is presently in the middle, Microsoft® Windows® operating systems (including, e.g., Microsoft Windows 2000®, Microsoft Windows XP® and Microsoft Windows 2003®) maintain an out-of-session-ARP-check-timeout of 2 minutes.

In addition, according to several address resolution protocols, when sending an address resolution packet with opcode REQUEST before removing an entry from the translation table, the address resolution packet is broadcasted instead of sending it directly to the physical address in the table.

U.S. Pat. No. 7,124,197 ("Security apparatus and method for local area networks", published in 2006) describes a method and apparatus for controlling data link layer access to protected servers on a computer network by a client device. Address resolution requests broadcast on the network by the client device seeking access to any network device are received and then processed to determine whether the client device is unknown. If the client device is unknown, restriction address resolution replies are transmitted to the protected devices to restrict access by the client device to the protected devices and allow access to an authentication server. The authentication server is monitored to determine if the client device is authorized or unauthorized by the authentication server. If the client device is authorized, access is allowed to the protected devices. If the client device is unauthorized, blocking address resolution replies are transmitted on the computer network to block access by the client device to all other network devices.

WO2005/053230 ("Method and system for collecting information relating to a communication network", published in 2005) discloses a method and a system for collecting information relating to a communication network. Data conveyed by nodes operating in the communication network is detected in a manner that is transparent to the nodes. The detected data is analyzed for identifying information relating to the communication network and for identifying missing information. According to WO2005/053230, in order to complete the missing information, one or more of the nodes are queried.

SUMMARY OF THE INVENTION

There is illustrated a method for restricting a first node in a broadcast domain of an IP (Internet Protocol) network from communicating with one or more other nodes, each of the first node and the one or more other nodes having a respective translation table that maps an IP address to a respective physical address of all nodes with which the first node and the one or more other nodes have communicated, the method comprising:

obtaining communicated data including address resolution messages;

accessing an address resolution table representative of address resolution activity in the network; and responsive to said communicated data indicating that the first node is communicating with other nodes, restricting the first node from communicating by generating and conveying a restricting address resolution message using information stored in the address resolution table, the restricting address resolution message including a substitute physical address.

There is further illustrated a method for maintaining an address resolution table representative of address resolution activity in the network, the method including:

obtaining communicated data including an address resolution message exchanged between a first node and one or more other nodes, each one of the first node and the one or more other nodes having a respective translation table that maps an IP address to a respective physical address of all nodes with which the first node and the one or more other nodes have communicated; and updating information stored in said address resolution table so as to represent changes to information stored in the translation tables respective of the first nodes and the one or more nodes.

There is still further illustrated an apparatus for restricting a first node in a broadcast domain of an IP (Internet Protocol) network from communicating with one or more other nodes each of the first node and the one or more other nodes having a respective translation table that maps an IP address to a respective physical address of all nodes with which the first node and the one or more other nodes have communicated, the apparatus comprising:

a network monitor for obtaining communicated data including address resolution messages;

a restricting processor coupled to said network monitor and having access to an address resolution table representative of address resolution activity in the network, the restricting processor being responsive to communicated data indicating that the first node is communicating with other nodes, for restricting the first node from communicating by generating and conveying a restricting address resolution message using information stored in the address resolution table, the restricting address resolution message including a substitute physical address.

Still further, there is illustrated an apparatus for maintaining an address resolution table representative of address resolution activity in the network, the method including:

a network monitor for obtaining communicated data including an address resolution message exchanged between a first node and one or more other nodes, each one of the first node and the one or more other nodes having a respective translation table that maps an IP address to a respective physical address of all nodes with which the first node and the one or more other nodes have communicated; and a table manager coupled to said network monitor and responsive to communicated data indicating that the first node is communicating with other nodes, for updating information stored in said address resolution table so as to represent changes to information stored in the translation tables respective of the first nodes and the one or more nodes.

Still further, there is illustrated a computer program comprising computer program code means for performing the method for restricting a first node in a broadcast domain of an IP (Internet Protocol) network from communicating with one or more other nodes, when said program is run on a computer.

In addition, there is illustrated a computer program comprising computer program code means for performing the method for maintaining an address resolution table representative of address resolution activity in the network.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
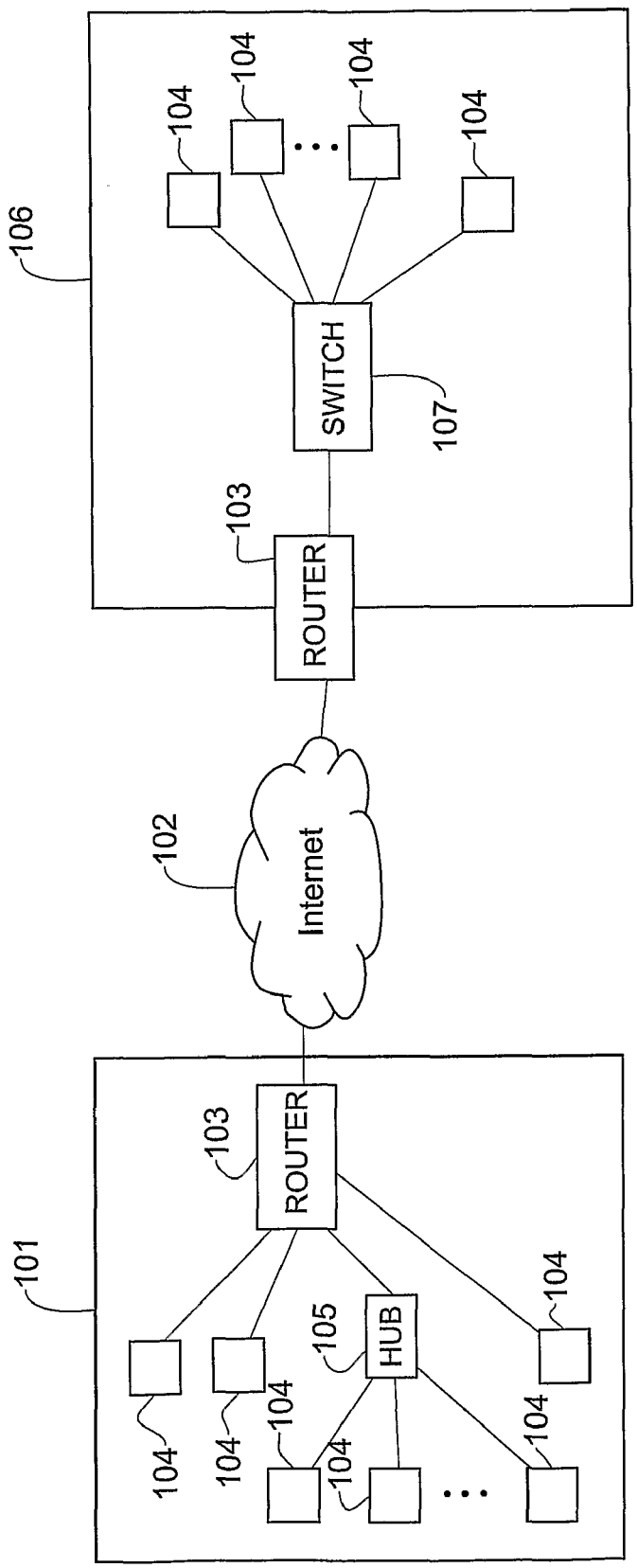
FIG. 1 is a schematic illustration of IP networks including nodes.

In the following description components that are common to more than one figure will be referenced by the same reference numerals.

Hereinafter, unless specifically noted, the term IP refers to Internet Protocol.

Figure 2:
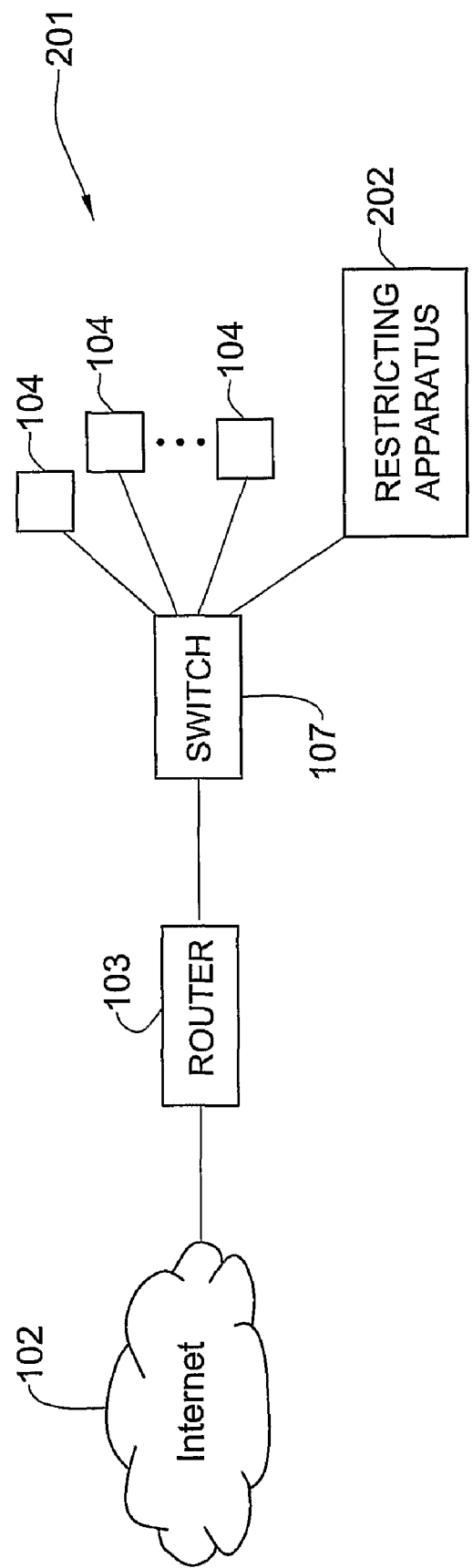
FIG. 2 is a schematic illustration of an IP network including a restricting apparatus, according to one embodiment of the invention.

FIG. 2 is a schematic illustration of an IP network 201 including a restricting apparatus 202, according to one embodiment of the invention. Similar to network 106 of FIG. 1, the IP network 201 includes a switch 107 and end nodes 104, and it is connected to the Internet 102 via a router 103. However, unlike network 106, the present network 201 includes a restricting apparatus 202 allowing restricting nodes from communicating with other nodes in the network 201. According to certain embodiments the restricting apparatus 202 is a node in the network 201, however, it should be appreciated that the restricting apparatus may include more than one interface card and hence more than one physical address. For example, the restricting apparatus may include a network monitor, a network detector and/or a communication controller; all are described with reference to FIG. 3 below (see 301, 302 and 307, respectively). Generally, every node in the network can include more than one interface card and hence may have more than one physical address. In such a case the embodiments described below refer separately to each one of the interface cards that are part of the broadcast domain, as if they were separate nodes.

It is appreciated by those versed in the art that in order to allow communication between any two nodes in a broadcast domain of a local area network (LAN), or in other words, in a broadcast domain of an IP network, each one of the two nodes must have information relating to the other node, including the respective physical address, known as a Media Access Control (MAC) address. For example, a node 'A' that knows the IP address of a node 'B' in the broadcast domain must resolve, or determine, the physical address of 'B' in order to be able to communicate therewith. The opposite is also true. In order to communicate with 'A', 'B' must know the IP address thereof and resolve 'A's physical address. One non-limiting way for resolving a physical address of a node in the broadcast domain is using the Address Resolution Protocol (ARP), defined in RFC 826. Yet, the present invention is not limited to ARP and it can be used with other address resolution protocols as well, wherein ARP is taken hereinafter as an example. Understanding this, it should be appreciated that according to several embodiments of the invention, by preventing 'A' from resolving 'B's physical address, and/or by preventing 'B' from resolving 'A's physical address, communication between these two nodes can be restricted. It should be appreciated that a node whose communication with at least one node out of all the nodes operating in the broadcast domain is restricted has reduced communicational capabilities when compared with other nodes that are free to communicate with any other node in the broadcast domain. Thus, understanding that "at least one node" sometimes means "all nodes operating in the broadcast domain", it is appreciated that "restricting" sometimes means total prevention (the node's communication with all the other nodes in the broadcast domain is restricted), while at other times it means that the node cannot communicate with one or more nodes, while it can communicate with other nodes.

According to certain embodiments, upon startup, or upon installation, the restricting apparatus obtains "network information" relating to the identity of the nodes operating in the broadcast domain where it resides and possibly also relating to the operating systems operating on the nodes and their respective IP and physical addresses. The network information obtained upon startup constitutes a "baseline". One way for obtaining the baseline is by using the methods presented in WO2005/053230. However, this is non-limiting and any other method for obtaining the network information is applicable, including, e.g., the method described in "*The Present and Future of Xprobe2*" by Ofir Arkin et al, July 2003 (which was published on the Internet), or even manual feed of the nodes' identity information.

Furthermore, understanding that an IP network is a dynamic network (i.e., nodes can disconnect from the network, other nodes can connect thereto, and yet other nodes may move), the restricting apparatus needs to continuously monitor the network in order to keep the network information up-to-date. This can also be done in accordance with any available method (such as the methods of WO2005/053230, and/or "*The Present and Future of Xprobe2*", mentioned above). Any node which is monitored by the restricting apparatus constitutes a "monitored node".

Figure 3:
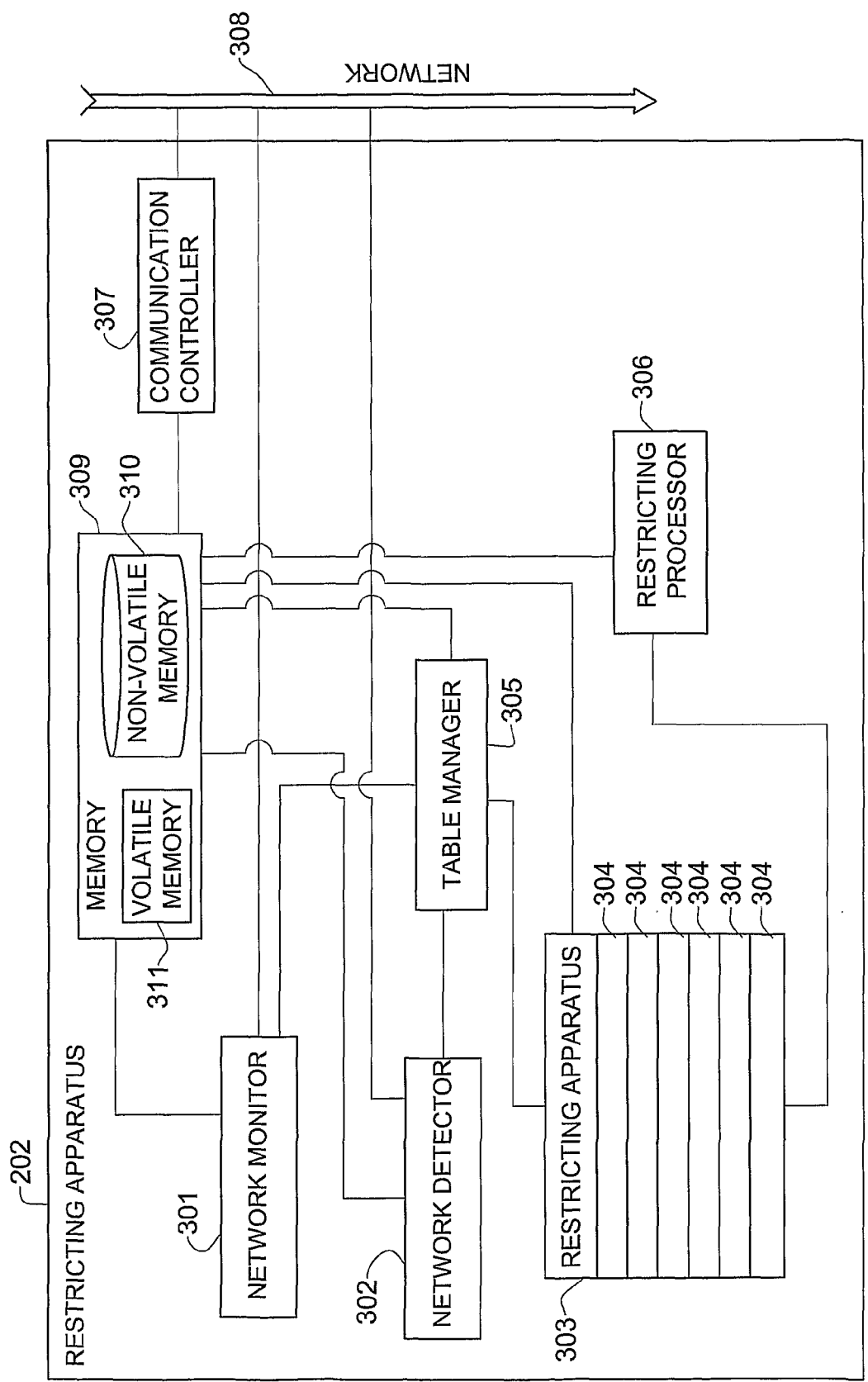
FIG. 3 is a block diagram schematically illustrating a restricting apparatus, in accordance with certain embodiments of the invention.

FIG. 3 is a block diagram schematically illustrating a restricting apparatus 202, in accordance with certain embodiments of the invention. A network monitor 301 obtains the baseline and continues to monitor the network and the nodes included therein in order to keep the network information up-to-date. In addition, the restricting apparatus includes, or is coupled to a network detector 302, such as a known per se sniffer, which detects communicated data. It is noted that communicated data includes address resolution communication (such as address resolution requests, address resolution replies and gratuitous address resolution messages) but it is non-limited thereby. For example, communicated data can include also non-address resolution communication such as layer three (3) packets, such as Internet Protocol (IP) packets.

Furthermore, the restricting apparatus has access to a table constituting an "address resolution table" which is sometimes referred to also as a "virtual ARP table", or shortly an "ARP table" 303. The address resolution table represents address resolution activity (such as ARP activity) in the network and it includes entries 304. A table manager 305 is coupled to the address resolution table and allows maintenance of the table and the data included therein. It should be appreciated that the table manager 305 is coupled to the network monitor 301 and to the network detector 302, obtaining information therefrom and operating responsively to the obtained information. In addition, a restricting processor 306, which has access to the address resolution table 303, can restrict nodes from communicating with other nodes in the network. Furthermore, 307 is a communication controller. The communication controller 307 is connected to the network and has a physical address and an IP address, allowing it to obtain and convey data from and to nodes operating in the network.

To this end the certain embodiments of the restricting apparatus 202 include also memory 308, which in turn may include volatile memory 309, such as RAM, and non-volatile memory 310, such as disk and/or flash memory etc. It is noted, for example, that the network monitor 301 can provide network information as output stored in the memory, e.g., in the volatile memory. Similarly, the network detector 302 can also provide output to be stored in the non-volatile memory 310, as does the table manager 305 that can store the address resolution table in the non-volatile memory 310, and even the communication controller 307, that can use a memory device (309 and/or 310) in order to provide information to the table manager 305, and/or in order to relay communication, and/or in order to store a list of selectable nodes etc.

Appreciating that each address resolution request (such as an ARP request) is sent from a "source node" in order to resolve the physical address of a "target node" whose IP address is known, and that each one of the source and target nodes has a respective translation table that maps an IP address to a respective physical address of all nodes with which the source and target nodes have communicated, it is noted that respective to each source node there is an entry 304 in the address resolution table 303. The entry includes the source node's IP address, and a "nodes-list" which is a list of IP addresses representative of nodes whose physical address is known to the source node, including, for example, target nodes of address resolution requests sent from that source node. The address resolution table 303, therefore, is representative of address resolution activity in the network.

The embodiment of FIG. 3 is non-limiting. According to different embodiments of the invention, instead of obtaining the baseline from the network monitor 301, the restricting apparatus 202 can start operating when the address resolution table is empty (or in other words, when the baseline is empty) and gradually fill the address resolution table with data further to information indicative of communicated data, obtained from the network detector 302. Alternatively, before the restricting apparatus 202's operation terminates it is possible to store in a non volatile storage device an image of the address resolution table, i.e., copy of the data stored therein. Then, when operation of the restricting apparatus 202 resumes, instead of starting with an empty address resolution table, it is possible to start operating with an address resolution table including data that was previously stored in the non-volatile memory 310, e.g., data stored therein before the restricting apparatus 202 terminated operating, and then updating the address resolution table further to obtaining information indicative of communicated data from the network detector 302. According to yet other embodiments, the initial content of the address resolution table, namely, the "baseline", can be obtained from any other source, such as a source external to the system that is not depicted in FIG. 3 because is it external to the restricting apparatus 202.

Furthermore, according to alternative embodiments, the table manager 305 and the address resolution table 303 can be external to the restricting apparatus 202. Then, the restricting apparatus can have access to the address resolution table 303, using information stored therein in order to restrict communication.

In the background of the present invention it is explained that according to RFC 826, in order to keep the translation table up-to-date, after a suitable time duration constituting an "ARP-check-timeout", the source node may send an ARP request directly to a target node's Ethernet address, as listed in its translation table, thus checking that the target node has not moved since the last update of the translation table. Hence, it is appreciated that further to monitoring the network for time duration longer than the ARP-check-timeout, the restricting apparatus may detect more than one address resolution request sent from a source node, trying to resolve the physical address of each target node. Therefore, according to certain embodiments, a timestamp is added with respect to the IP address of each target node in the nodes-lists of the address resolution table's entries. Whenever an address resolution message, including an address resolution request or an address resolution reply is detected, the entries respective of its source node and target node are updated, wherein the timestamps represent the time the address resolution message was detected. Yet, alternatives are allowed. For example, if the address resolution message includes a respective timestamp associated therewith, it is possible to represent this respective timestamp instead of the time the address resolution message was detected.

For example, after startup (i.e., when the address resolution table is empty) on 17:04:20 the network detector detects an address resolution request sent from a source node whose IP address is 192.168.1.10 to resolve the physical address of a target node whose IP address is 192.168.1.5. Therefore, further to updating the address resolution table, and according to certain embodiments of the invention (see, e.g., FIG. 9 described below) it will include two entries, each having one target node in its nodes-list, as follows:
  192.168.1.10: 192.168.1.5 (17:04:20)
  192.168.1.5: 192.168.1.10 (17:04:20)

On 17:04:21 the network detector detects another address resolution request, sent from the same source node 192.168.1.10 to resolve the physical address of the target node 192.168.1.7. Hence the entry respective of 192.168.1.10 is updated to include 192.168.1.7 in its nodes-list; a new entry is generated for 192.168.1.7, including 192.168.1.10 in its nodes-list; and the content of the address resolution table becomes:
  192.168.1.10: 192.16.1.5 (17:04:20); 192.168.1.7 (17:04:21)
  192.168.1.5: 192.168.1.10 (17:04:20)
  192.168.1.7: 192.168.1.10 (17:04:21)

Those versed in the art would appreciate that when an address resolution request (such as the one sent by 192.168.1.10 in order to resolve the physical address of 192.168.1.7) is broadcasted, 192.168.1.5 will also see it, and because 192.168.1.10 is listed in its translation table, the entry thereof will be updated. Accordingly, the timestamp of 192.168.1.10 in 192.168.1.5's is updated as well, whereupon the table's content becomes:
  192.168.1.10: 192.168.1.5 (17:04:20); 192.168.1.7 (17:04:21)
  192.168.1.5: 192.168.1.10 (17:04:21)
  192.168.1.7: 192.168.1.10 (17:04:21)

This is considered an "indirect update" and it is further explained with reference to the following example: It is appreciated that according to RFC 826, when a source node broadcasts an ARP request trying to resolve the physical address of a target node, other nodes apart from the target node obtain this ARP request. If one or more of these other nodes find that the source node is listed in their translation table, they use the ARP request for updating their translation table, although they are not the target node whose physical address needs to be resolved. Therefore, according to certain embodiments of the present invention, upon detecting an address resolution request sent from a source node in order to resolve the physical address of a target node, the entries of the address resolution table are checked in order to identify whether the source node is listed in the nodes-list respective of any of them. If the source node is found to be listed in any of the nodes-lists, its time stamp is updated to reflect the time when the request was detected.

Hence, returning to the latter example, if on 17:04:42 the network detector detects an ARP request sent from source node 192.168.1.5 to resolve the physical address of the target node 192.168.1.9, the entry respective of 192.168.1.5 is updated to include 192.168.1.9 in the list; a new entry is added for 192.168.1.9, to include 192.168.1.5 in its nodes-list, and in addition, the timestamp respective of 192.168.1.5 in the nodes-list respective of 192.168.1.10's entry is updated. The content of the address resolution table becomes:

192.168.1.10:   192.168.1.5   (17:04:42);   192.168.1.7 (17:04:21)
192.168.1.5:   192.168.1.10   (17:04:21);   192.168.1.9 (17:04:42)
192.168.1.9: 192.168.1.5 (17:04:42)
192.168.1.7: 192.168.1.10 (17:04:21)

According to certain embodiments of the invention, when the network monitor 301 detects that a certain node does not exist anymore in the network (it was probably disconnected or shut down, and is referred to as a "disconnected node"), the entry of this disconnected node is removed from the address resolution table. Yet, if this disconnected node is listed in any other entry's nodes-list, this nodes-list is not modified.

Returning to the example presented above, if the network monitor notifies the restricting apparatus that node 192.168.1.5 is a disconnected node, this node's entry is removed from the address resolution table, but the entry respective of node 192.168.1.10 and node 192.168.1.9 does not change, although 192.168.1.5 is listed in its nodes-list. The content of the address resolution table then becomes:

192.168.1.10:   192.168.1.5   (17:04:42);   192.168.1.7 (17:04:21)
192.168.1.9: 192.168.1.5 (17:04:42)
192.168.1.7: 192.168.1.10 (17:04:21)

Furthermore, according to certain embodiments, an "expiry-timeout" is defined. If the restricting apparatus or the table manager finds out that any of the nodes-lists included in the address resolution table includes an IP address whose respective timestamp is older than the expiry-timeout, this IP address is deleted from the nodes-lists, together with the respective timestamp.

A non-limiting example of the expiry-timeout's value is "T+Δ", wherein the value of T is the longer amongst the in-session-ARP-check-timeout and the out-of-session-ARP-check-timeout that are determined in accordance with the operating system operating on the target node. In the Microsoft® Windows® operating systems' example (including, e.g., Microsoft Windows 2000®, Microsoft Windows XP® and Microsoft Windows 2003®) T becomes the in-session-ARP-check-timeout of 10 minutes.

It is noted that, e.g., in those embodiments wherein the network monitor 301 operates in accordance with WO2005/053230, the network detector may be able to detect the operating system operating on each node in the network, and hence T's predetermined value can be set accordingly for each target node. However, this is non-limiting and other embodiments can use other methods for determining the value of T apart from letting it be the ARP-check-timeout value of the target node. For example, according to an alternative embodiment there may be a single T used for all the target nodes. This single T can be determined, e.g., to be the longest ARP-check-timeout characterizing the operating systems operating on nodes in the network. Alternatively, if the operating system operating on a node having a certain IP address is unknown, it is possible to let T have a default value.

In the example presented above it was noted that the expiry-timeout can be set to T+Δ, while according to one example Δ=1 minute. It can be appreciated now that Δ is added in order to verify that an ARP request sent by the source node (including retries) is not missed. It should also be appreciated that the Δ's value is configurable and can be set to any value applicable to the case, including time durations which are longer or shorter than 1 minute, including 0 (zero) or "unlimited", when applicable. In addition, it is further possible, according to certain embodiments, to have different Δ values respective of different entries and/or different target nodes listed in a nodes-list. It is noted that by setting Δ to unlimited the respective target node will not expire.

Figure 4:
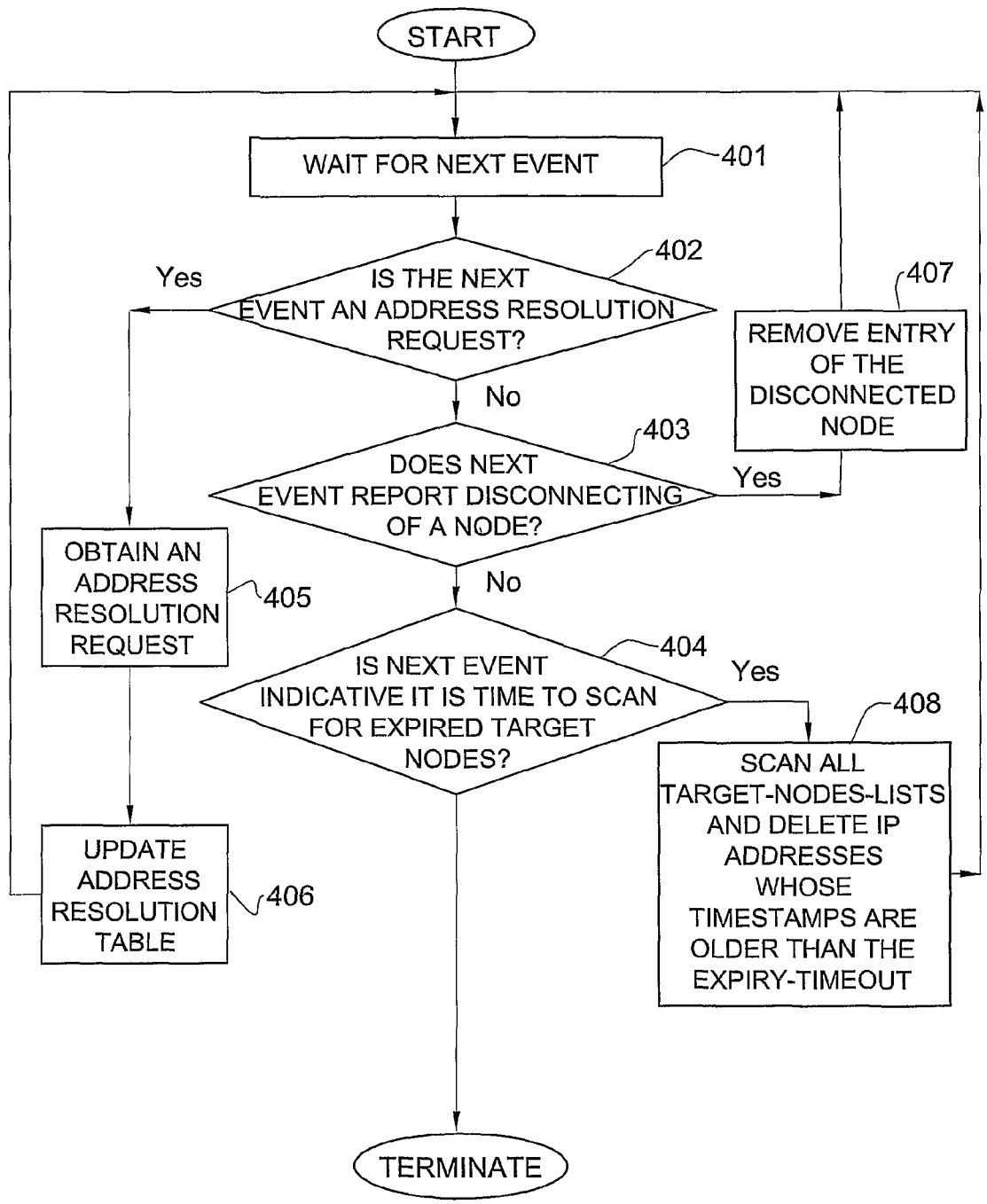
FIG. 4 is a flowchart representing maintenance of an address resolution table, in accordance with certain embodiments of the invention.

FIG. 4 is a flowchart representing maintenance of an address resolution table, in accordance with certain embodiments of the invention. According to certain embodiments, the method described in the flowchart can be performed by the table manager 305, yet it can be performed by other modules or apparatuses external to the restricting apparatus 202 and hence it should be appreciated that, generally, the method of FIG. 4 can be performed by an apparatus for maintaining an address resolution table.

It is noted that the method described in the flowchart is event driven and characterized by sequential operation. This is reflected by 401, 402, 403 and 404. Yet, alternative embodiments may exist wherein each kind of event is handled, e.g., by a different manager, operating as a separate processor or possibly even as a thread of a single table manager. Other alternatives are also possible, such as scanning for expired target nodes (and deletion thereof) after handling each address resolution request that is obtained etc.

If it is determined on 402 that the next event is an address resolution request, the request is obtained on 405 and the address resolution request is processed on 406 in order to update the address resolution table. If the address resolution request is exchanged between a first node and one or more other nodes, and appreciating that each one of the first node and the one or more other nodes has a respective translation table that maps an IP address to a respective physical address of all nodes with which the first node and the one or more other nodes have communicated, 406 represents updating information stored in the address resolution table so as to represent changes to the information stored in the translation tables respective of the first nodes and the one or more nodes.

Figure 5:
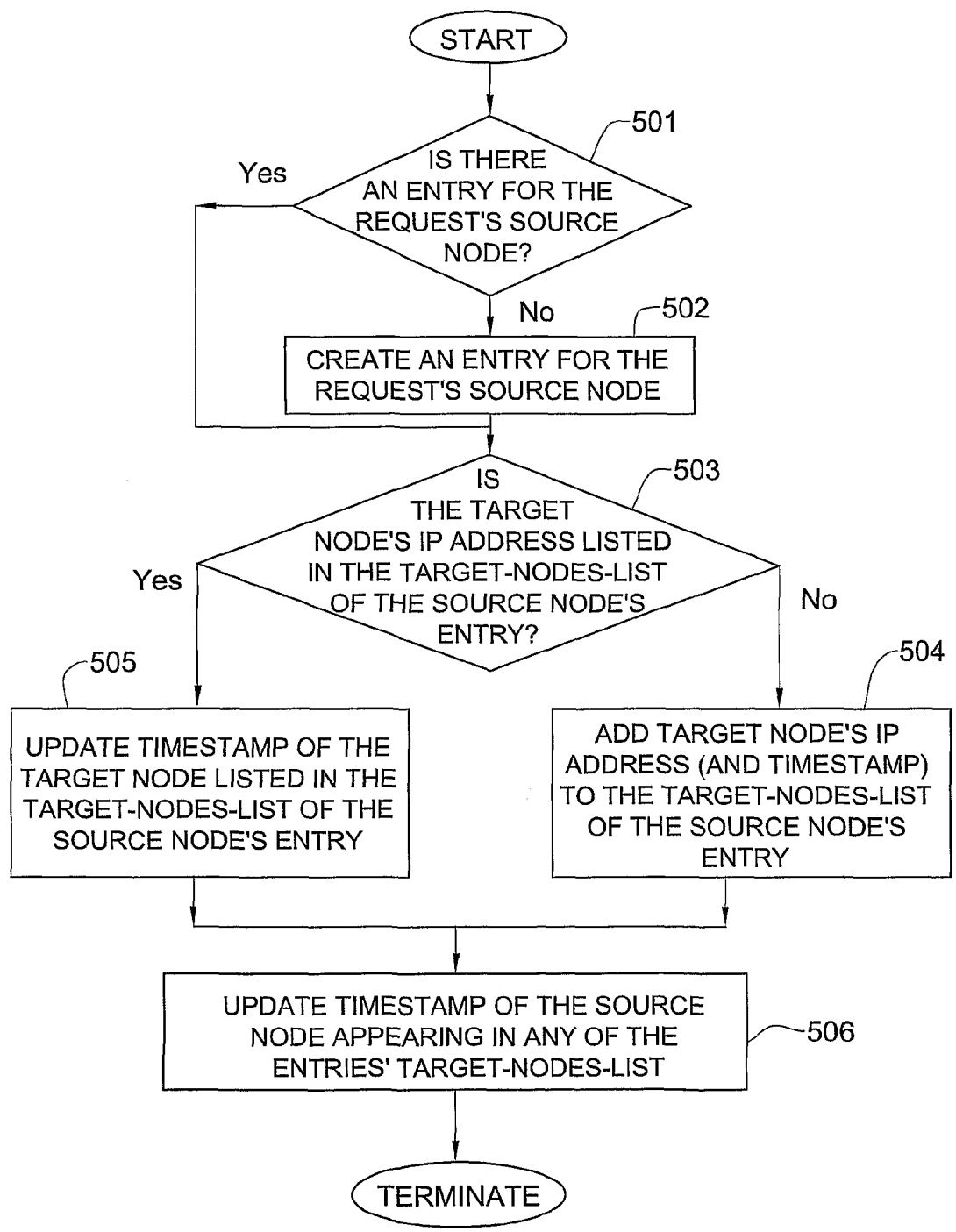
FIG. 5 is a flowchart illustrating update of an address resolution table further to obtaining an address resolution request, in accordance with certain embodiments of the invention.

One non-limiting way for updating the table upon obtaining an address resolution request is illustrated in FIG. 5: If on 501 it is found that an entry respective of the source node does not exist in the address resolution table, on 502 the entry is created. Then, if it is found on 503 that the IP address of the target node whose physical address is being resolved is not listed in the nodes-list of the source node's entry, on 504 it is added thereto (together with a timestamp). Otherwise, if the IP address of the target node is listed therein, on 505, its timestamp is updated. On 506 the timestamps of all appearances of the source node's IP address are updated, that is, timestamps associated with this source's node's IP address appearing in nodes-lists of other entries, thus reflecting indirect updates to translation tables of other nodes to which the other entries correspond. Then, returning to FIG. 4 and after updating the address resolution table on 406, the method is ready to process the next event, as indicated by 401.

According to the method illustrated in FIG. 4, upon obtaining an address resolution request, it is the request's source node's entry that is updated, together with timestamps respective of the request's source node's IP address that are already listed in the nodes-list of other entries. It should be noted that alternatives are allowed as can be seen for example in the alternative described with reference to FIG. 9 below.

Returning now to 402, if it is determined thereon that the next event is not an address resolution request, it is possible that the event is a node's disconnecting report (see 403), whereupon the node's entry is removed from the address resolution table (on 407). Alternatively, it is possible that the event is an indication that it is time to scan the nodes-list and find those target nodes' IP addresses whose timestamps are older than the expiry-timeout (see 404), deleting them on 408.

Apart from event management, other alternatives may also exist for the embodiment illustrated in FIG. 4. For example, according to certain embodiments, entries are added to the address resolution table whenever the network monitor 301 reports that a node is connected to the network. Hence, in accordance with such embodiments, an entry respective of each node in the network is added to the address resolution table upon obtaining the baseline, and then, new entries are added when the network monitor 301 reports that nodes are connecting, while existing entries are deleted when the network monitor 301 reports that nodes are disconnecting from the network.

According to another embodiment of the invention, expiry-timeouts are not checked (unlike, for example, 404 and 408) and hence IP-addresses of nodes are deleted from the nodes-lists only upon obtaining nodes' disconnecting reports (e.g., see 403).

In addition, any other embodiment is also allowed, if applicable, including combinations. According to one such combination, entries are added and removed further to the network monitor 301 reports. However, if an address resolution message, such as an address resolution request is detected, whose respective source node has no entry in the table, such an entry is created (similar to 502 in FIG. 5).

Further to understanding the table manager and the address resolution table maintenance, it should be appreciated that sometimes it is required to isolate a communication device constituting a first node operating in an IP network, by restricting its communication with other nodes in the network. According to several embodiments, this includes quarantining the first node, and shielding it from the network and the communication devices attached thereto (i.e., shielding it from other nodes in the network).

The selection of those nodes whose communication should be restricted can be done in accordance with different methods and policies. For example, it may be preferred to restrict the communication of every node connecting to the network, until a privileged operator (e.g., a security administrator or a computerized inspector) confirms that the node is clear and can communicate freely. Alternatively, a node whose communication is not restricted may become a restricted node due to suspicious activity thereon (e.g., a user tries to log into a certain application several times, with a wrong password). According to yet other embodiments, a restricted node is sometimes allowed to communicate with selectable nodes, e.g., when there are services that should preferably be available to the restricted node, etc. It should be appreciated that in this latter case, an alternative to stating that a restricted node is allowed to communicate with selectable nodes, it may be stated that the restricted node is restricted from communicating with selectable nodes. An operator maintaining the restricting apparatus and/or the communication network can indicate which nodes constitute the selectable nodes with whom the restricted node is allowed to communicate and/or he can indicate which nodes constitute the selectable nodes which whom the restricted node is restricted from communicating.

When communication of a communicating node constituting a first node needs to be restricted, the restricting processor 306 accesses the address resolution table, and restricts the first node's communication using information stored therein.

Figure 6:
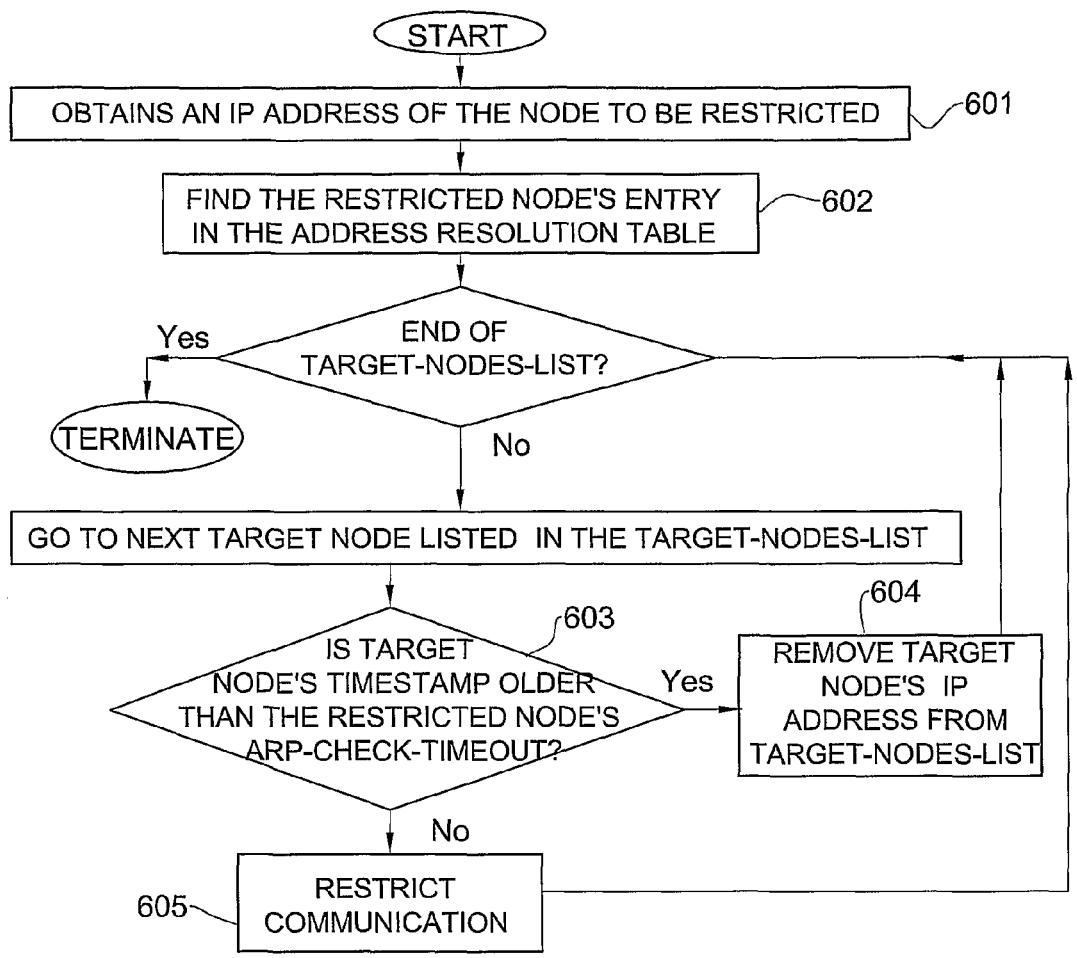
FIG. 6 is a flowchart illustrating the operations performed while restricting communication of a node communicating in an IP network, according to certain embodiments of the invention.

FIG. 6 is a flowchart illustrating the operations performed while restricting communication of a first node communicating in an IP network, according to certain embodiments of the invention. On 601 the restricting processor obtains the first node's IP address, and on 602 it looks for the first node's entry in the address resolution table. On 603 the timestamp respective of all the target nodes listed in the nodes-list of the entry are checked, and if any of them is found to be older than the first node's ARP-check-timeout, on 604 the respective target node's IP address is removed from the nodes-list. However, for every target node whose timestamp is found on 602 to be younger than the first node's ARP-check-timeout or equal thereto, on 605 the node's communication with the target node is restricted.

Figure 7:
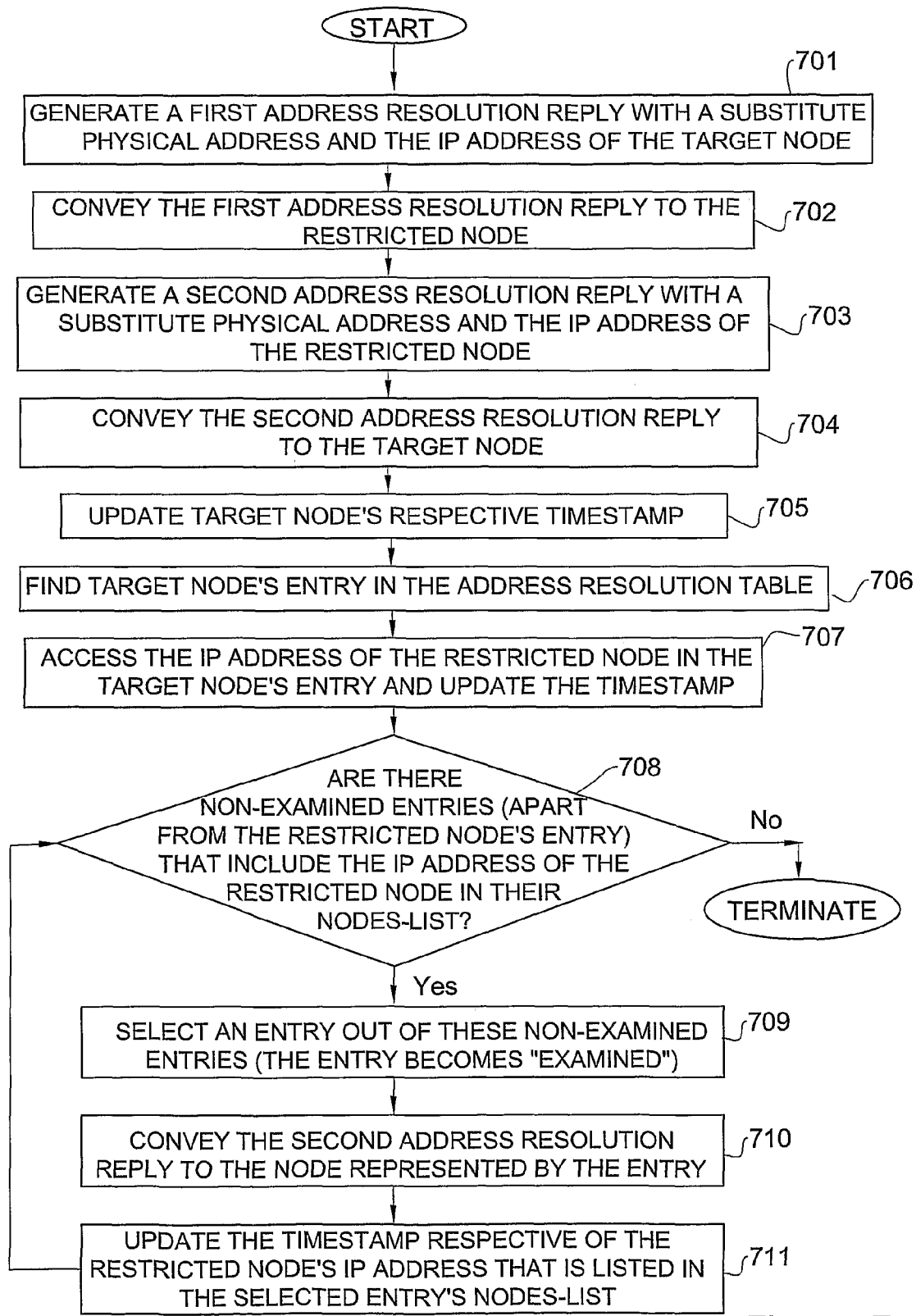
FIG. 7 is a flowchart illustrating restricting communication with a node, according to certain embodiments of the invention.

One non-limiting way to restrict communication is illustrated by the flowchart of FIG. 7, wherein on 701 the restricting processor generates a first address resolution reply with a substitute physical address and with the IP address of the target node, while on 702 this first address resolution reply is conveyed to the first node. It is appreciated by those versed in the art that further to obtaining the first address resolution reply, the first node inserts the substitute physical address into its translation table, binding it therein with the target node's IP address. Therefore, when the first node tries communicating with the target node, conveying data thereto, it will transparently convey the data to the substitute physical address instead, thereby restricting the first node's communication. Hence the first address resolution reply constitutes a "restricting address resolution message". Then, on 703 a second address resolution reply is generated, with a substitute physical address and the IP address of the first node, while on 704 this second address resolution reply is conveyed to the target node. It is appreciated by those versed in the art that like the first node, further to obtaining the second address resolution reply, the target node inserts the substitute physical address into its translation table, binding it therein with the first node's IP address. Therefore, when the target node tries communicating with the first node, conveying data thereto, it will transparently convey the data to the substitute physical address instead, thus restricting communication with the first node. Hence the second address resolution reply also constitutes a "restricting address resolution message". Furthermore, it should be noted that if the first node and the target node are in the middle of a communication session while obtaining the first and second address resolution replies, respectively, the session will discontinue, or break.

In addition to conveying the two address resolution replies, on 705 the timestamp respective of the target node in the nodes-list is updated to substantively indicate the time when the two address resolution replies were sent. In addition, on 706 the restricting processor finds the target node's entry in the address resolution table, and on 707 it similarly updates the timestamp respective of the first node's IP address in the nodes-list of the target node's entry, to be indicative of the substantive time when the two address resolution replies were sent.

It is noted, though, that the embodiment presented in FIG. 7 is non-limiting and alternatives may exist when applicable. For example, according to certain embodiments, the substitute physical address included in the first address resolution reply (see 701) can be different than the substitute physical address included in the second address resolution reply (see 703), while according to alternative embodiments the same physical address can be used in both replies. In addition, according to certain embodiments, the substitute physical address (or addresses) can be a nonexistent or "fake" address that does not exist in the network. Those versed in the art would appreciate that by doing this the first node and/or the target node will convey data to void. Alternatively, the substitute physical address (or addresses) can be a physical address of a node operating in the network, such as the physical address of the communication controller 307. This way the communication controller can become an intermediary agent that can relay the communication transmitted between the first node and the target node, or block the data, hence avoiding from forwarding it to its destination, thereby restricting communication.

Appreciating that address resolution requests can trigger indirect updating of other node's translation tables and of the address resolution table (see, e.g., 506 in FIG. 5), alternative embodiments of the invention may exist, wherein the second address resolution reply is conveyed to other nodes, indirectly updated with the source node's physical address, in addition to conveying it to the target node on 704. In order to do so, on 708 the restricting processor checked whether there are any more entries in the address resolution table, whose nodes-list lists the IP address of the first node (note that the first node is the restricted node). If in the affirmative, one of these entries is selected on 709 (note that this entry becomes "examined" and hence it will not be considered the next time the restricting processor reaches 708), on 710 the second address resolution reply (see, e.g., 703) is conveyed to the node which is represented by the selected entry and on 711 the timestamp respective of the first node's IP address in the selected entry's nodes-list is updated.

In addition, according to the embodiment of FIGS. 6 and 7, the restricting processor restricts communication between the first node and any other node in the broadcast domain, including any one of the target nodes whose IP addresses are represented by the nodes-list of the first node's entry and nodes that are indirectly updated with the first node's physical address. It should be appreciated that according to certain alternative embodiments it is possible to restrict communication between the first node and one or more of the other nodes, while allowing communication with yet other nodes. Namely, according to this latter alternative, the first node's communication is restricted while allowing communication with selectable nodes. One way for achieving this is by using a certain node, such as the communication controller 307, for relaying communication (as explained above) between the restricted node and the selectable nodes while blocking communication with other, non-selectable nodes. However, those versed in the art would appreciate that a relaying node may slow down communication and hence it may be desirable to use an alternative embodiment, wherein, e.g., before checking on 603 whether the target node's respective timestamp is older than the first node's ARP-check-timeout, it is possible to check whether the communication between the first node and the present target node should be blocked, and if not, move directly to the next target node listed in the nodes-list, thus skipping 604 or 605. In addition or instead, before conveying the second resolution reply to the indirectly updated node (see 710) it is possible to check whether the communication between the first node and this indirectly updated node should be blocked, and if not, move directly to 708.

Yet according to another alternative, it is possible to operate in accordance with the method of FIGS. 6 and 7, thus restricting communication between any two nodes, including the selectable nodes. Then, corrective measures can be taken, including accessing the translation tables of the restricted node and the selectable node, by conveying corrective address resolution packets thereto, thus enforcing the restricted node's translation table to be updated with the selectable node's physical address and the selectable node's translation table to be updated with the restricted node's physical address. The corrective measures can be taken periodically, e.g., once in every z seconds, wherein z can be configurable. It should be appreciated that further to enforcing the translation tables of the restricted node and the selectable node to be updated, these nodes do not require address resolution, thus bypassing the restriction mechanism and allowing communication between the two nodes.

Further to the latter embodiments and reverting, e.g, to the network illustrated in FIG. 2, it should be appreciated that it is possible to restrict communication between a restricted node and any other node in the network, including the router 103. By restricting the restricted node from communicating with the router 103, allowing it to communicate with all other nodes in the system, it is possible to allow free operation of the restricted node in the broadcast domain, while preventing the restricted node from accessing other nodes which are operating out of the broadcast domain, that is, nodes which are not part of the broadcast domain, including, e.g., the Internet 102. Alternatively, further to understanding that the communication controller 307 may become an intermediary agent positioned between the restricted node and the router, it can be appreciated that it is possible to restrict or to allow communication between the restricted node and one or more selectable nodes which are not part of the broadcast domain. While restricting communication with selectable nodes which are not part of the broadcast domain while allowing communication with all other nodes, the communication controller 307 would block data designated to or originated from any one of the selectable nodes, relaying data designated to or originated from other nodes. While allowing communication with selectable nodes which are not part of the broadcast domain while restricting communication with all other nodes, the communication controller 307 would relay data designated to or originated from any one of the selectable nodes, blocking data designated to or originated from other nodes.

According to certain embodiments, instead of comparing the timestamps and the first node's ARP-check-timeout on 603, it is possible to compare the timestamps with an expression, such as $T$ or $T+\Delta$. According to the embodiment described with reference to FIG. 6, the value of $T$ is the first node's ARP-check-timeout that is determined in accordance with the operating system operating thereon or the longest amongst the in-session-ARP-check-timeout and the out-of-session-ARP-check-timeout, while it is noted that, e.g., in those embodiments wherein the network monitor 301 operates in accordance with WO2005/053230, the network detector may be able to detect the operating system operating on the first node, and hence $T$'s predetermined value can be set. However, this is non-limiting and other embodiments can use other methods for determining the value of $T$ apart from letting it be similar to the ARP-check-timeout value of the first node. For example, according to an alternative embodiment there may be a single T value used for all the nodes in the system, including the first node, regardless of the operating systems operating thereon. This single T can be determined, e.g., to be the longest ARP-check-timeout characterizing the operating systems operating on nodes in the network. Alternatively, if the operating system operating on the first node or on one or more of the other nodes is unknown, it is possible to let T have a default value.

It was noted above that it is possible to compare the timestamp (on 603) with an expression such as T+$\Delta$, while according to one example $\Delta$=1 minute. It can be appreciated now that $\Delta$ is added in order to verify that an address resolution request sent by the first node (including retries) is not missed. It should also be appreciated that the $\Delta$'s value is configurable and can be set to any value applicable to the case, including time durations which are longer or shorter than 1 minute, including 0 (zero) or "unlimited", when applicable. It is noted that by setting $\Delta$ to unlimited the respective target node's IP address will not be removed from the nodes-list.

It is noted that there is no necessary connection between the values compared on 603 and between the expiry-timeout described above with reference to FIG. 4 (see, e.g., 404). The value compared with the timestamp on 603 can be the same as the first node's expiry-timeout or it can be different therefrom. Similarly, it can be the same as the target node's expiry-timeout or it can be different therefrom.

Instead, or in combination with the alternatives suggested above, it is possible to generate and convey only the first address resolution reply (see 701 and 702) or the second address resolution reply (703, 704 and/or 710) to the first node, to the target node or to the indirectly updated nodes, respectively. Doing this, the node which obtains the address resolution reply with the substitute physical address will continue conveying data to the correct destination, however, it will get no response, including IP handshakes, acknowledging messages etc., and hence it will become impossible to start a communication session between the two nodes. If the two nodes are already in the middle of a session, the session will soon be disconnected by higher level protocols, such as TCP (Transmission Control Protocol) which will obtain no acknowledging messages.

After understanding the embodiments presented so far, alternatives will now be described. But beforehand, it should be appreciated that there are several types of address resolution messages used for resolving physical addresses of nodes in a network. For example:

An address resolution request broadcasted to all nodes in the broadcast domain. It is appreciated that in ARP an address resolution request constitutes an "ARP request" and an ARP request broadcasted to the nodes in the broadcast domain constitutes a "broadcasted ARP request". When a node constituting an "obtaining node", whose translation table includes an entry representative of the ARP request's source node, obtains a broadcasted ARP request, the entry is updated to include the source node's physical address as indicated in the broadcasted ARP request. However, if there is no entry for the source node in the translation table, the table is not updated, unless the obtaining node is the target node, whose physical address is to be resolved, whereupon an entry representative of the source node is added to the table, binding the source node's IP address with its physical address, as listed in the broadcasted ARP request.

An address resolution request conveyed specifically to the target node whose physical address should be resolved (unlike a broadcasted resolution request). It is appreciated that in ARP this address resolution request constitutes a "unicast ARP request". Upon obtaining a unicast ARP request, the target node will respond in a way similar to its response to a broadcasted ARP request, while it is appreciated that another node will not obtain the unicast ARP request.

A "unicast address resolution reply", which is an address resolution reply sent specifically to a node's physical address. It is appreciated that in ARP an address resolution reply constitutes an "ARP reply" and an ARP reply sent specifically to a node's physical address constitutes a "unicast ARP reply". It is noted that normally in ARP, a unicast ARP reply is conveyed by a target node to a source node in response to obtaining an ARP request from a source node. Upon obtaining a unicast ARP reply, if the source node's translation table includes an entry representative of the target node, this entry is updated, thus binding the target node's IP address to the physical address listed in the ARP reply.

An address resolution reply broadcasted to the nodes included in a broadcast domain. It is appreciated that such an address resolution message constitutes a "broadcasted address resolution reply" while specifically in ARP an ARP reply broadcasted to a broadcast domain constitutes a "broadcasted ARP reply". It is appreciated that in ARP, Broadcasted ARP replies affect only the translation tables that include an entry respective of the node whose address is being resolved by the reply, while translation tables of all other nodes in the broadcast domain remain unaffected.

A "gratuitous address resolution request" is an address resolution request whose source node's IP address and target node's IP address are the same, which is broadcasted to the broadcast domain. In ARP, such an address resolution request constitutes a "gratuitous ARP request".

It is noted though that in some address resolution protocols, such as ARP, it is possible to generate and convey an address resolution message containing information about the generating node's protocol address and physical address, without a preceding address resolution request. Such a message constitutes a "gratuitous address resolution message". In ARP the gratuitous address resolution message constitutes a "gratuitous ARP message". It is noted that a gratuitous address resolution message can use, in some protocols, an address resolution reply data structure (e.g. a message including the op-code REPLY), in which case the message can be referred to also as a "gratuitous address resolution reply". It should be appreciated that a gratuitous address resolution message sent specifically to a node constitutes a "unicast gratuitous address resolution message", while a gratuitous address resolution message broadcasted to the broadcast domain constitutes a "broadcasted gratuitous address resolution message".

Figure 8:
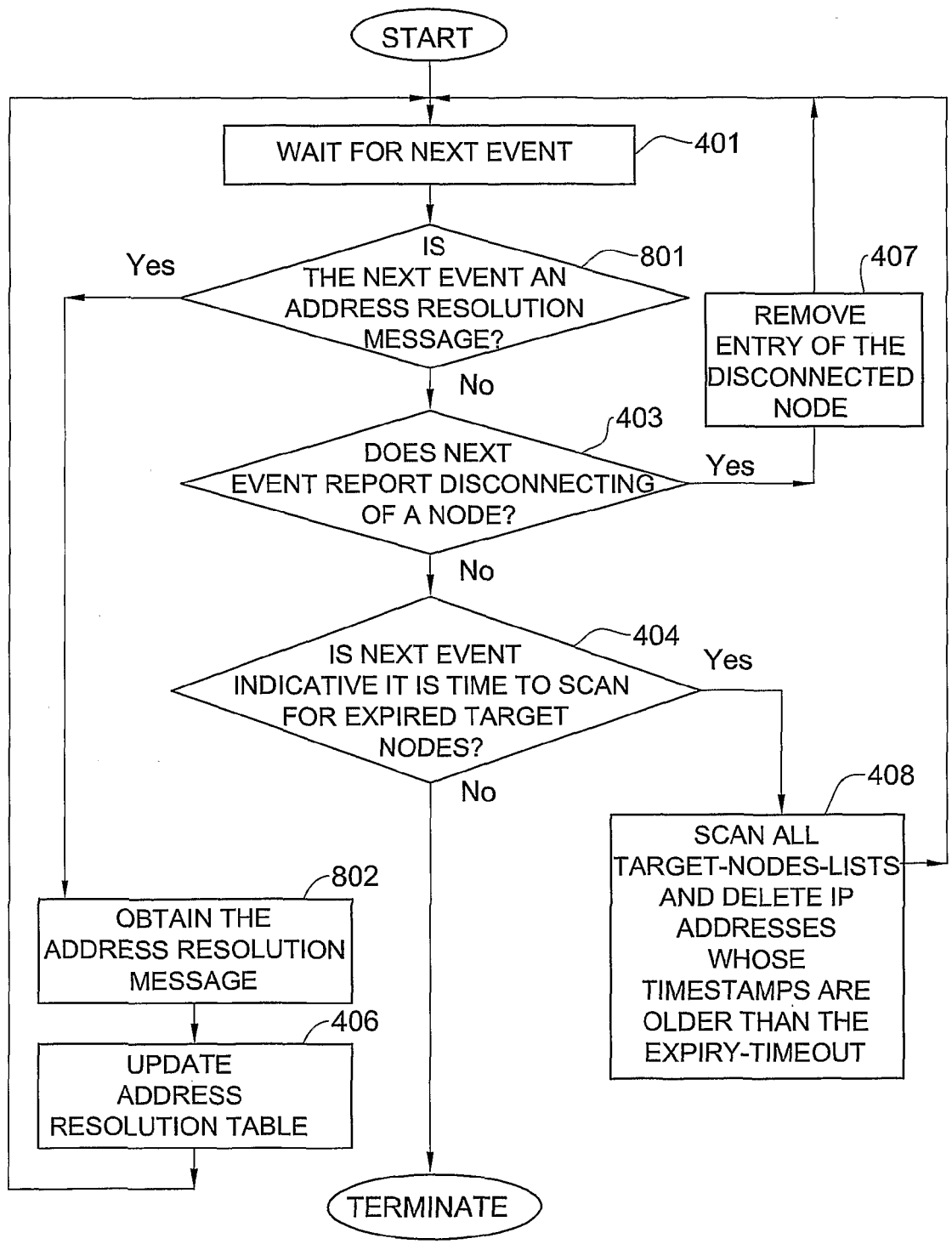
FIG. 8 is a flowchart representing maintenance of an address resolution table, in accordance with other embodiments of the invention.

Returning now to FIG. 4, it is noted that the embodiment presented thereby updates the address resolution table upon obtaining an address resolution request, See, for example, 402 and 405. However, it should be appreciated that the method of FIG. 4 is non-limiting and other embodiments may exist. For example, the address resolution table can be updated in response to obtaining an address resolution message of other types, unlike updating only in response to obtaining an address resolution request. Therefore, FIG. 8 is a generalization of the method illustrated in FIG. 4. In the figure, the address resolution table is updated (406) upon obtaining any type of address resolution message (see 801 and 802).

According to alternative embodiments, in 408, when checking that the time stamp of an IP address that represents a restricted node is older than the expiry-timeout, it is possible to use an expiry-timeout shorter than the ARP-check timeout, an expiry-timeout that is the shortest amongst the in-session-ARP-check-timeout and an out-of-session-ARP-check-timeout, or even an expiry-timeout that is shorter than the shortest amongst the two timeouts, as applicable to the case.

Like the embodiment of FIG. 4, if the address resolution message obtained on 802 is an address resolution request, 406 can be performed in accordance with the embodiment of FIG. 5. Yet, according to other embodiments of the invention, illustrated, e.g., by the flowchart of FIG. 9, in addition to checking, on 501, whether there is an entry for the address resolution request's source node in the address resolution table, adding an entry if required (on 502) and updating timestamps and the nodes-list (see 504, 505 and 506), according to the present embodiment, 901 checks whether there is an entry for the target node in the address resolution table, and if not, such an entry is created on 902. Then, on 903, if it is found that the source node's IP address is not listed in the nodes-list of the target node's entry, on 904 it is listed therein (together with a timestamp). Otherwise, if the source node's IP address is already listed, the respective timestamp is updated on 905.

Figure 9:
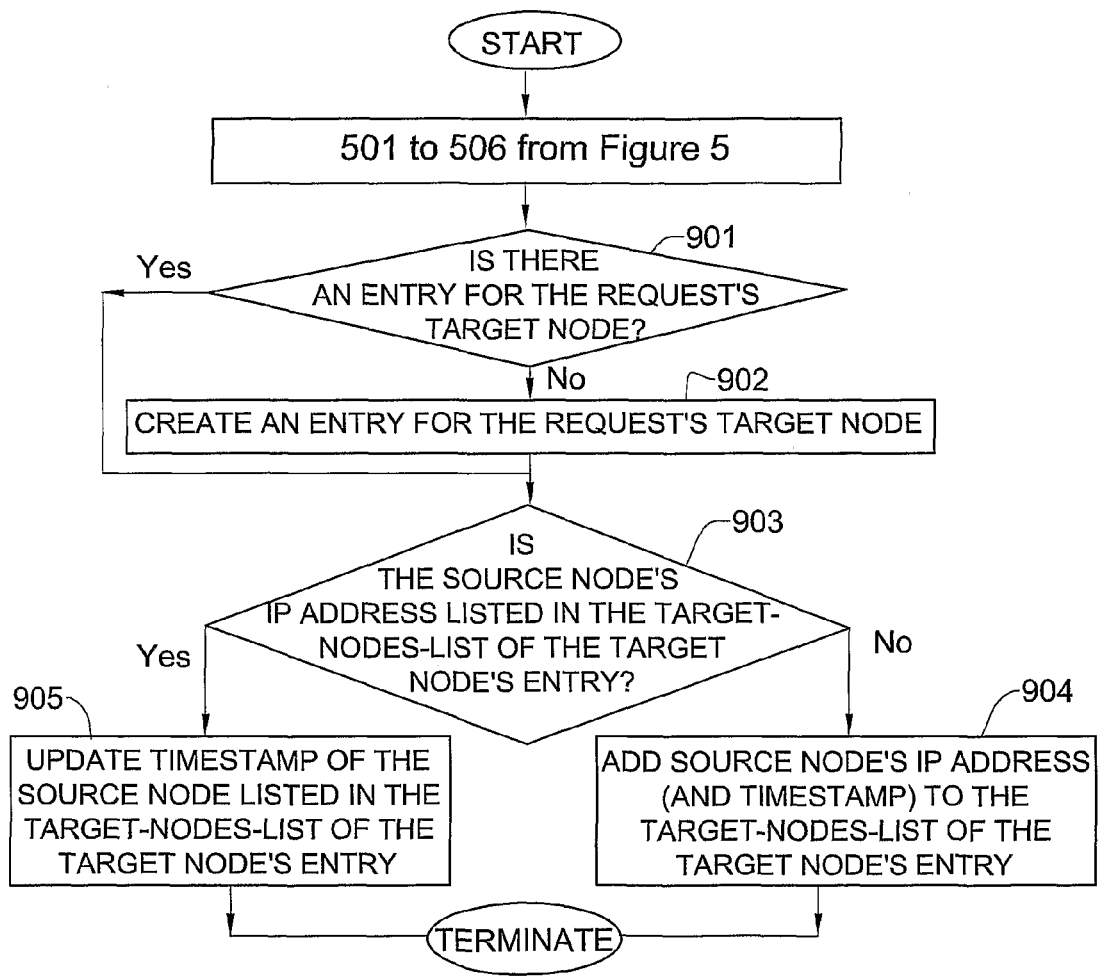
FIG. 9 is a flowchart illustrating maintenance of an address resolution table upon obtaining an address resolution request, according to certain embodiments of the invention.
Figure 10:
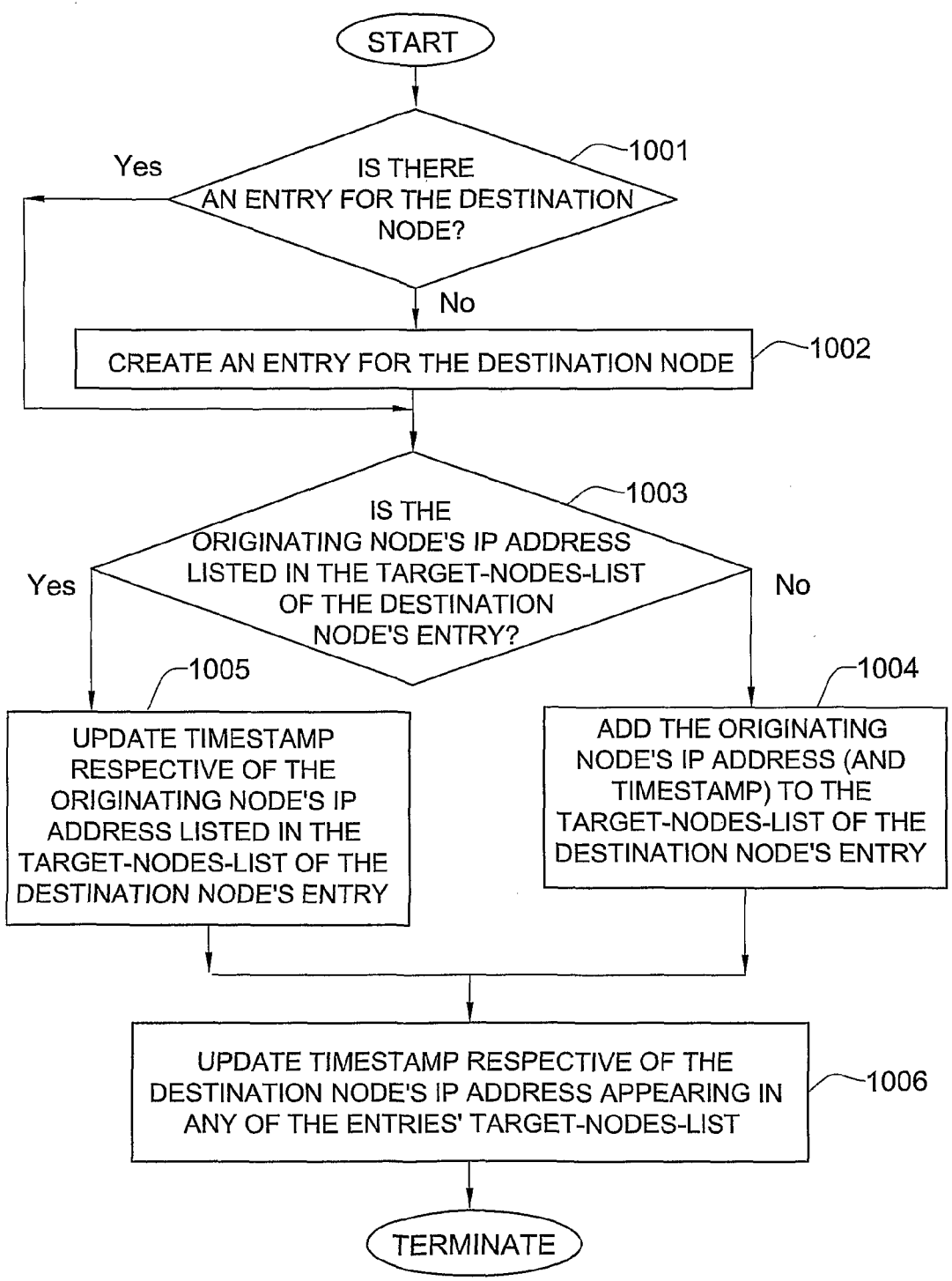
FIG. 10 is a flowchart illustrating maintenance of an address resolution table upon obtaining an address resolution reply, according to certain embodiments of the invention.

Yet, the embodiment of FIG. 9 describes how to update the address resolution table further to obtaining an address resolution request, which might be a broadcasted address resolution request or a unicast address resolution request. For example, in ARP, a broadcasted ARP request will be processed similarly to a unicast ARP request. It should be appreciated that according to other embodiments of the invention it is possible to update the address resolution table upon obtaining an address resolution reply of any type (i.e., a broadcasted address resolution reply or a unicast address resolution reply) and/or a gratuitous address resolution message. One such non-limiting embodiment is illustrated in FIG. 10. However, before attending to the figure, it should be noted, though, that normally, an address resolution request is conveyed from a source node, in order to resolve a target node's physical address, and then the target node conveys an address resolution reply to the source node. Hence, while processing an address resolution reply, it appears that a target node conveys the reply to a source node, while the source and target nodes may be confused by the reader. Confusion becomes even more evident when the address resolution reply is a broadcasted gratuitous address resolution message, wherein there is no specific node to which the message is conveyed, or in other words, there is no "source node" to which the message is conveyed. In order to avoid such confusion, instead of using the terms "source node" and "target node", the term "originating node" is used to refer to the node whose physical address is resolved by an address resolution message, and the term "destination node" is used while referring to a node to whom the information is destined while the originating node is not necessarily the node that composed and conveyed the message. It is noted that if the address resolution message is a broadcasted gratuitous address resolution message, instead of having a specific destination node the message is conveyed to the any node in the broadcast domain that finds interest in the message, while according to ARP, for example, these are all the nodes having the originating node represented in their translation table.

Figure 11:
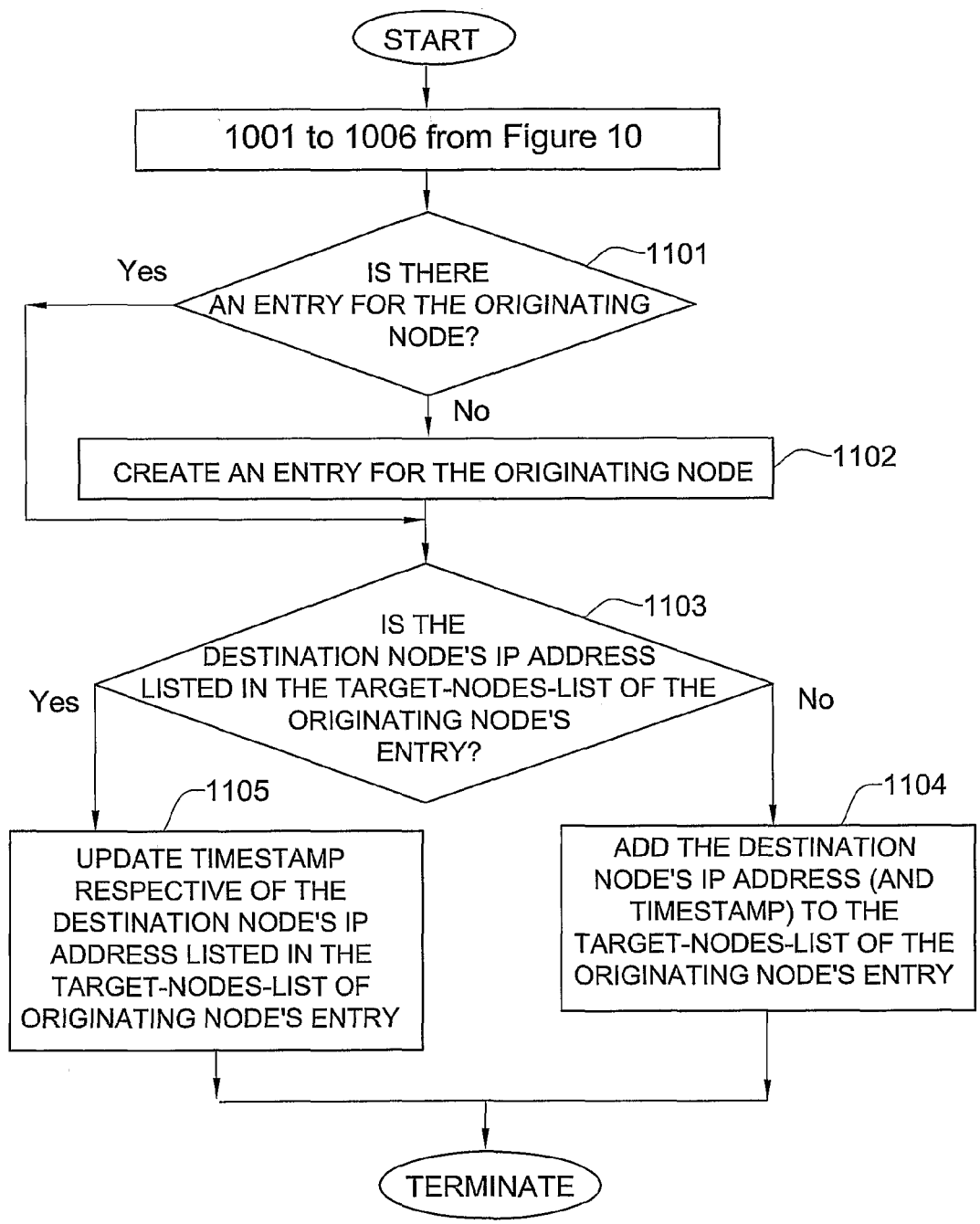
FIG. 11 is a flowchart illustrating maintenance of an address resolution table upon obtaining an address resolution reply, according to other embodiments of the invention.

FIGS. 10 and 11 are flowcharts illustrating maintenance of an address resolution table upon obtaining a unicast address resolution reply, according to two different non-limiting embodiments of the invention. Please note that both figures refer to an address resolution reply message having an originating and a destination node, and they can be substituted for 406 in FIG. 8, instead of substituting FIG. 5 or 9 therefore.

Similar to the embodiment of FIG. 5, those embodiments operating in accordance with the flowchart of FIG. 10 verify (on 1001) that the reply's destination node has an entry representative thereof in the address resolution table, and if such an entry does not exist, it is created on 1002. Then, the IP address of the originating node is listed in the entry's nodes-list and the timestamp respective thereof is updated (see 1003, 1004 and 1005). On 1006 the timestamps respective of the destination node's IP address appearing in nodes-lists of any other entry are updated, thus reflecting indirect update of the nodes represented by these other entries.

In the embodiment of FIG. 11, in addition to the procedures taken in accordance with the embodiment of FIG. 10 (1001 to 1006), additional procedures are taken to reflect updates occurring in the reply's source node's translation table. If it is determined on 1101 that the translation table includes no entry representative of the address resolution reply's source node, such an entry is created on 1102. Then, the IP address of the originating node is listed in the entry's nodes-list and the timestamp respective thereof is updated (see 1103, 1104 and 1105).

According to yet other embodiments, if the address resolution message is a unicast address resolution reply and/or a unicast gratuitous address resolution message, the method of FIG. 10 or 11 can be applied with a variation, according to which 1006 is skipped, hence, timestamps associated with the message's destination node's IP address appearing in nodes-lists of other entries are not updated.

Figure 12:
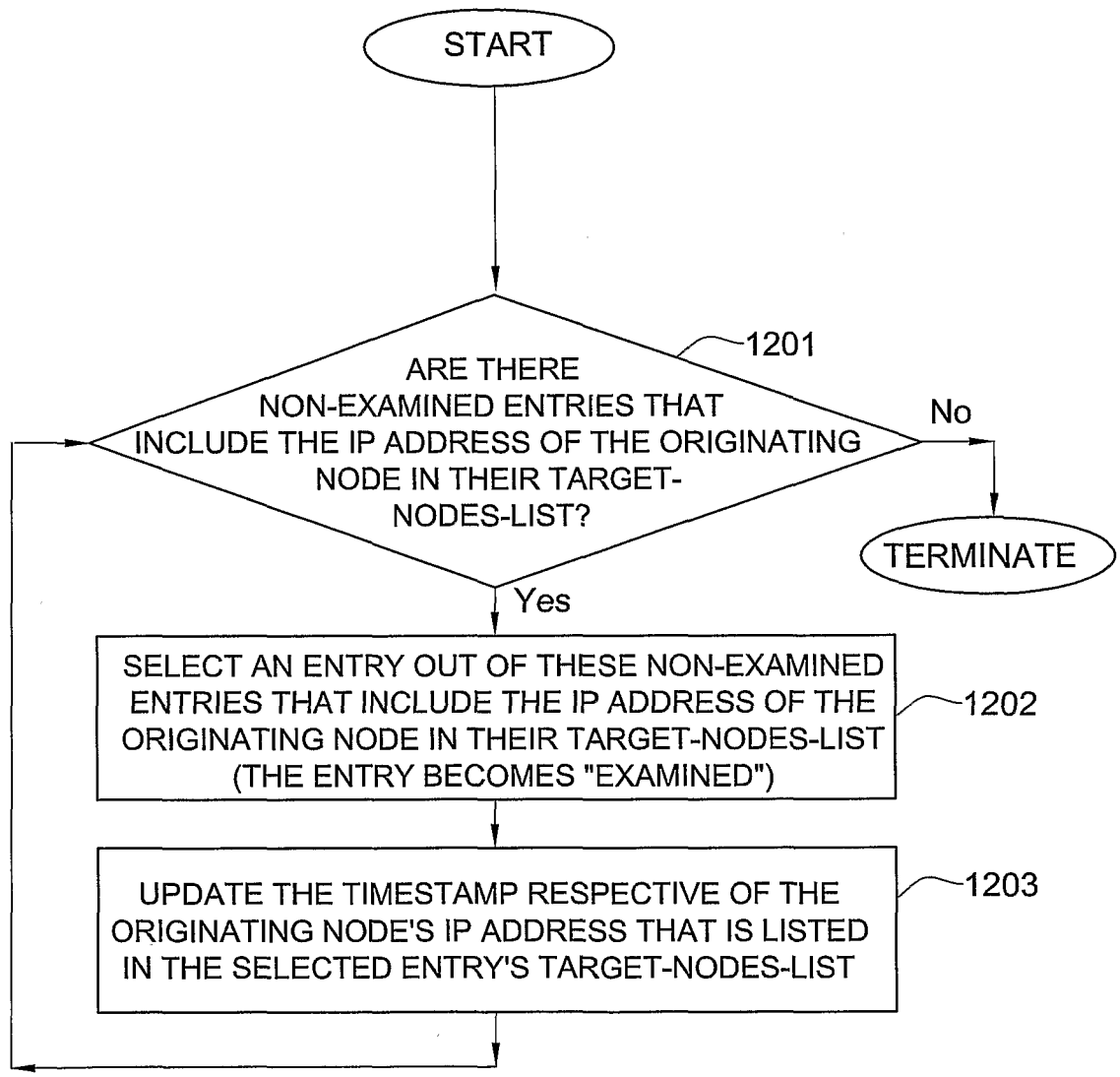
FIG. 12 is a flowchart illustrating the operations performed while obtaining a broadcasted address resolution reply, according to certain embodiments of the invention.

FIG. 12 is a flowchart illustrating the operations performed while obtaining a broadcasted address resolution reply, according to certain embodiments of the invention. It was previously explained that a broadcasted address resolution reply can be considered also as if it is conveyed to any node in the broadcast domain that includes in its translation table an element respective of the originating node. Hence, upon obtaining such a broadcasted address resolution reply on all the address resolution table's entries that include the IP address of reply's originating node in their nodes-list are examined (see 1202), and for each one of them (see 1203) the timestamp respective of the originating node's IP address is updated (1204).

Further to understanding how the address resolution table is maintained in response to obtaining different types of address resolution messages according to different embodiments of the invention, and further to understanding the embodiment of FIG. 6 and several alternatives thereof, it may be appreciated by those versed in the art that a restricted node (referred to also as a first node) may issue, from time to time unicast and/or broadcasted address resolution requests to different nodes in the broadcast domain. For example, before removing an entry from its translation table a restricted node can send a unicast address resolution request to a node's substitute physical address. According to a different example, after removing an entry from its translation table a restricted node can send a broadcasted address resolution request trying to resolve the address of a node in the broadcast domain, e.g., in order to re-communicate therewith. Upon obtaining the address resolution request from the network using, e.g., the network detector 302 the restricting processor 306 can use it, for example, in order to trigger the method of FIG. 6 (or any applicable alternative thereof), thus continuously restricting the first node from communicating. Moreover, according to those embodiments whereupon the substitute physical address belongs, e.g., to the communication controller 307, upon obtaining the address resolution request, the communication controller 307 can convey the request, or information indicative thereof to the restricting processor 306 in order to trigger the method of FIG. 6 (or any applicable alternative thereof). Alternatively, according to other embodiments, instead of waiting for the first node's address resolution request, it is possible to have in the restricting processor a restricting-timer that is shorter than the first node's ARP-check-timeout, or alternatively, shorter than the shortest amongst the in-session-ARP-check-timeout and the out-of-session-ARP-check-timeout, where applicable. Whenever the timer expires, the method of FIG. 6 (or any applicable alternative thereof) is triggered, thus automatically generating and conveying an address resolution reply to the first node, preventing it from sending the address resolution request to the substitute physical address. This latter alternative is operative also in those cases when the substitute physical address is a nonexistent address that causes the first node to send the address resolution request to void (when the communication controller 307, if exists, cannot convey the request or information indicative thereof to the restricting processor 306, simply because it does not obtain it). In addition, it should be appreciated that this alternative, of having a timer shorter than the first node's ARP-check-timeout, is applicable also in those cases when further to the expiry of the ARP-check-timeout, the first node broadcasts the address resolution request, instead of conveying it directly to the substitute physical address. Due to the automatically generated and conveyed address resolution reply, the first node's ARP-check-timeout will not expire and the first node will not issue the address resolution request, whether conveyed to the physical address of the communication controller, whether conveyed to void, or whether broadcasted to every node in the broadcast domain.

According to certain embodiments, upon obtaining an address resolution request from a requesting node trying to resolve a restricted node's physical address, it is appreciated that the resolution request should include the restricted node's IP address. Reverting to FIGS. 5 and/or 9, if the restricted node has no entry in the address resolution table, a new entry is created therefor, and the IP address of the requesting node is added to the nodes-list of the restricted node's entry, together with a timestamp. In addition, if the requesting node has no entry in the table, a new entry can be created therefor. The IP address of the restricted node is added to the nodes-list of the requesting node's entry, together with a timestamp. Then, similar to 701, 702, 703 and 704 of FIG. 7, a first address resolution reply can be generated, including a substitute physical address and conveyed to the restricted node, restricting communication therefrom. Instead, or in addition to the first address resolution reply, a second address resolution reply can be generated, including a substitute physical address, and conveyed to the requesting node, restricting communication with the restricted node.

In response, when the restricted node conveys an address resolution reply to the requesting node (which is non-restricted), upon detecting this reply the restricting apparatus can operate in order to restrict communication. The restricting apparatus can generate a fist message, conveying it to the restricted node (corresponding, e.g., 701 and 702 in FIG. 7), and/or it can generate a second message, conveying it to the requesting node (corresponding, e.g., 703 and 704 in FIG. 7), and/or it can convey the second message also to all those nodes updated indirectly by requests sent from the restricted node (corresponding, e.g., 708 to 711 in FIG. 7).

Similarly, when a restricted node sends an address resolution request, trying to resolve the physical address of another node in the network, according to certain embodiments of the present invention the restricted node's IP address is added to the nodes-list of the other node's entry (if required, such an entry is created) together with a timestamp, and the other node's IP address is added to the nodes-list of the restricted node's entry (if required, such an entry is created) together with a time stamp. Then, for each target node listed in the nodes-list of the restricted node's entry a first and/or second address resolution reply is generated, including a substitute physical address, and transmitted to the restricted node and/or to the other node. Like before, certain embodiments can restrict communication from and/or with the restricted node upon obtaining address resolution messages of other types apart from an address resolution request, such as a unicast address resolution reply, a broadcasted address resolution reply, a gratuitous address resolution message (unicast or broadcasted) etc. Furthermore, in order to restrict other nodes from communicating with the restricted node, the second address resolution reply can be conveyed also to all those nodes updated indirectly by the restricted node's request (corresponding, e.g., 708 to 711 in FIG. 7).

In addition, those versed in the art may appreciate that when the first node sends an address resolution request to a target node, a "first time interval" passes before the target node obtains this request. Then the target node processes the address resolution request and conveys an address resolution reply back to the first node. The time interval passing from conveying the address resolution request until the address resolution reply is obtained by the first node constitutes a "second time interval". Returning to FIG. 7, if the restricting apparatus conveys the second address resolution reply to the target node (see 704) faster than the first time interval, the target node may obtain the first node's address resolution request (i.e., the restricted node's address resolution request) after obtaining the second address resolution reply, hence re-updating its respective translation table to include the first node's real physical address instead of the substitute address and bypassing the restriction mechanism, constituting a "first bypass". In order to prevent the first bypass from occurring, it is possible, according to certain embodiments of the invention, to convey the second address resolution reply more than once, ensuring that the time interval passing between the first transmittal to the last transmittal is longer than the first time interval.

In addition, if the restricting apparatus conveys the first address resolution reply to the first node (see 702) i.e., to the restricted node, faster than the second time interval, to the first node may obtain the target node's address resolution reply after obtaining the first address resolution reply, hence re-updating its respective translation table to include the target node's real physical address instead of the substitute address and bypassing the restriction mechanism, constituting a "second bypass". In order to prevent the second bypass from occurring, it is possible, according to certain embodiments of the invention, to convey the first address resolution reply more than once, ensuring that the time interval passing between the first transmittal to the last transmittal is longer than the second time interval.

Moreover, according to alternative embodiments, instead of generating and conveying the first and/or second address resolution replies, it is possible to generate and convey a first and/or second address resolution request. In the first address resolution request the source IP address is the target node's IP address, while the source physical address is a substitute address, hence, while further to conveying the first address resolution request to the first node, it will update its translation table with the substitute physical address bound to the target node's IP address, thus restricting communication therewith. It is noted that conveying the first address resolution request is done by unicasting the request instead of broadcasting it. Hence, the first address resolution request also constitutes a "restricting address resolution message". On the other hand, in the second address resolution request the source IP address is the first node's IP address, while the source physical address is a substitute address, hence, while further to conveying the second address resolution request to the target node, it will update its translation table with the substitute physical address bound to the first node's IP address, thus restricting communication therewith. It is noted that conveying the second address resolution request is done by unicasting the request instead of broadcasting it. Hence, the second address resolution request also constitutes a "restricting address resolution message".

It was noted, with reference to FIG. 3, that communicated data is not limited to address resolution communication. It is hence appreciated that when another kind of communication is detected by the network detector 302, this indicates that there is at least one node in the broadcast domain (where the network detector operates) that communicates with another node. If this at least one node is a restricted node, and the other node that the restricted node is communicating with has a physical address different than the substitute physical address, this indicates that further operation should be taken in order to restrict communication with the restricted node. According to certain embodiments, in this case, the address resolution table is maintained as if a request was sent from the restricted node to the other node. In addition, a first and a second address resolution reply can be generated and conveyed to the restricted node and to the other node, similar to the operation described further to obtaining an address resolution request sent from the restricted node, e.g., in accordance with FIG. 7.

It is noted that the embodiments described above can be used for securing a communication network.

It will be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The present invention has been described with a certain degree of particularity, but those versed in the art will readily appreciate that various alterations and modifications may be carried out, without departing from the scope of the following Claims:

The invention claimed is:

1. A method of restricting a first node in a broadcast domain of an IP (Internet Protocol) network from communicating with one or more other nodes, each of the first node and the one or more other nodes having a respective translation table that maps an IP address to a respective physical address of all nodes, with which the first node and the one or more other nodes communicated, wherein the method is provided through a computerized apparatus operatively coupled to the IP network, the method comprising:

obtaining communicated data, said communicated data comprising address resolution messages;

accessing a virtual address resolution table, which is representative of an address resolution activity in the IP network;

responsive to said communicated data, indicating that the first node is communicating with other nodes, restricting said first node from communicating by generating and conveying a restricting address resolution message by using information stored in said virtual address resolution table, said restricting address resolution message comprising a substitute physical address; and updating information stored in the virtual address resolution table so as to represent changes to the information stored in the translation tables respective of the first node and the one or more other nodes, wherein updating information stored in the virtual address resolution table comprises updating respective of an operating system running on each corresponding node over the IP network.

2. The method according to claim 1, further comprising providing within the restricting address resolution message an IP address of the first node.

3. The method according to claim 1, further comprising conveying the restricting address resolution message to the first node and/or to the one or more other nodes.

4. The method according to claim 1, further comprising providing within the restricting address resolution message an IP address of one of the other nodes.

5. The method according to claim 1, further comprising updating information stored in the virtual address resolution table respective of indirect updating of translation tables in nodes operating in the broadcast domain.

6. The method according to claim 1, further comprising providing the address resolution message as an address resolution request, an address resolution reply and a gratuitous address resolution message.

7. The method according to claim 1, wherein the substitute physical address is a nonexistent physical address that does not exist in the broadcast domain.

8. The method according to claim 1, wherein the substitute physical address is a physical address of a node operating in the broadcast domain.

9. The method according to claim 1, wherein the one or more other nodes are all other nodes operating in the broadcast domain.

10. The method according to claim 1, further comprising selecting the one or more other nodes from amongst all nodes operating in the broadcast domain.

11. The method according to claim 1, further comprising providing, within the one or more other nodes, at least one node that is operating out of the broadcast domain.

12. The method according to claim 1, further comprising providing the address resolution message as the communicated data, said communicated data being indicative that the first node is communicating with other nodes.

13. A method of restricting a first node in a broadcast domain of an IP (Internet Protocol) network from communicating with one or more other nodes, each of the first node and the one or more other nodes having a respective translation table that maps an IP address to a respective physical address of all nodes, with which the first node and the one or more other nodes communicated, wherein the method is provided through a computerized apparatus operatively coupled to the IP network, the method comprising:

obtaining communicated data, said communicated data comprising address resolution messages;

accessing a virtual address resolution table, which is representative of an address resolution activity in the IP network;

responsive to said communicated data, indicating that the first node is communicating with other nodes, restricting said first node from communicating by generating and conveying a restricting address resolution message by using information stored in said virtual address resolution table wherein the information stored in said virtual address resolution table comprises information maintained respective of an operating system running on each corresponding node of the IP network, said restricting address resolution message comprising a substitute physical address; and providing non-address resolution communication as the communicated data, said communicated data indicating that the first node is communicating with other nodes.

14. The method according to claim 13, further comprising providing the layer three communication as non-address resolution communication.

15. A method of restricting a first node in a broadcast domain of an IP (Internet Protocol) network from communicating with one or more other nodes, each of the first node and the one or more other nodes having a respective translation table that maps an IP address to a respective physical address of all nodes, with which the first node and the one or more other nodes communicated, wherein the method is provided through a computerized apparatus operatively coupled to the IP network the method comprising:

obtaining communicated data, said communicated data comprising address resolution messages;

accessing a virtual address resolution table, which is representative of an address resolution activity in the IP network;

responsive to said communicated data indicating that the first node is communicating with other nodes, restricting said first node from communicating by generating and conveying a restricting address resolution message by using information stored in said virtual address resolution table, said restricting address resolution message comprising a substitute physical address;

generating and conveying the restricting address resolution message in response to expiry of a restricting-timer; and affecting the restricting-timer by an ARP-check-timeout being predetermined by an operating system that operates on the first node.

16. A method of maintaining a virtual address resolution table that is representative of an address resolution activity in a network, wherein the method is provided through a computerized apparatus operatively coupled to the network, the method comprising:

obtaining communicated data that comprises an address resolution message, exchanged between a first node and one or more other nodes, each one of the first node and the one or more other nodes having a respective translation table that maps an IP (Internet Protocol) address to a respective physical address of all nodes, with which the first node and the one or more other nodes communicated; and updating information stored in said virtual address resolution table so as to represent changes to information stored in the translation tables respective of the first nodes and the one or more other nodes, wherein updating information stored in the virtual address resolution table comprises updating respective of an operating system running on each corresponding node over the IP network.

17. The method according to claim 16, further comprising deleting from the virtual address resolution table the information that represents one or more expired nodes.

18. An apparatus configured to restrict a first node in a broadcast domain of an IP (Internet Protocol) network from communicating with one or more other nodes, each of the first node and the one or more other nodes having a respective translation table that maps an IP address to a respective physical address of all nodes, with which the first node and the one or more other nodes communicated, the apparatus comprising:

a network monitor configured to obtain communicated data that comprises address resolution messages;

a restricting processor coupled to said network monitor and having access to a virtual address resolution table representative of address resolution activity in the IP network, said restricting processor being responsive to said communicated data indicating that the first node is communicating with other nodes, and said restricting processor configured to restrict the first node from communicating by generating and conveying a restricting address resolution message by using information stored in the virtual address resolution table wherein the information stored in said virtual address resolution table comprises information maintained respective of an operating system running on each corresponding node of the IP network, said restricting address resolution message comprising a substitute physical address; and a table manager coupled to said network monitor and responsive to the communicated data indicating that the first node is communicating with the one or more other nodes, said table manager configured to update information stored in the virtual address resolution table so as to represent changes to information stored in the translation tables respective of the first node and the one or more other nodes.

19. The apparatus according to claim 18, wherein the restricting processor is configured to generate a restricting address resolution message that in addition to the substitute physical address comprises an IP address of the first node.

20. The apparatus according to claim 18, wherein the restricting address resolution message is conveyed to the one or more other nodes.

21. The apparatus according to claim 18, wherein the restricting processor is configured to generate a restricting address resolution message that in addition to the substitute physical address comprises an IP address of one of the other nodes.

22. The apparatus according to claim 18, wherein the restricting address resolution message is conveyed to the first node.

23. An apparatus configured to restrict a first node in a broadcast domain of an IP (Internet Protocol) network from communicating with one or more other nodes, each of the first node and the one or more other nodes having a respective translation table that maps an IP address to a respective physical address of all nodes, with which the first node and the one or more other nodes communicated, the apparatus comprising:

a network monitor configured to obtain communicated data that comprises address resolution messages;

a restricting processor coupled to said network monitor and having access to a virtual address resolution table representative of address resolution activity in the IP network, said restricting processor being responsive to said communicated data indicating that the first node is communicating with other nodes, and said restricting processor configured to restrict the first node from communicating by generating and conveying a restricting address resolution message by using information stored in the virtual address resolution table, said restricting address resolution message comprising a substitute physical address; and a table manager coupled to said network monitor and responsive to the communicated data indicating that the first node is communicating with the one or more other nodes, said table manager configured to update the information stored in the virtual address resolution table respective of an operating system running on each corresponding node over the IP network.

24. An apparatus configured to maintain a virtual address resolution table representative of address resolution activity in a network, the apparatus comprising:

a network monitor comprising a non-transitory computer readable medium storing computer readable program code for causing a computer to obtain communicated data that comprises an address resolution message exchanged between a first node and one or more other nodes, each one of the first node and the one or more other nodes having a respective translation table that maps an IP (Internet Protocol) address to a respective physical address of all nodes, with which the first node and the one or more other nodes communicated; and a table manager coupled to said network monitor and responsive to said communicated data indicating that the first node is communicating with the one or more other nodes, said table manager comprising a non-transitory computer readable medium storing computer readable program code for causing a computer to update information stored in said virtual address resolution table so as to represent changes to information stored in the translation tables respective of the first node and the one or more other nodes, wherein the table manager is configured to update the information stored in the virtual address resolution table respective of an operating system running on each corresponding node over the network.

25. A non-transitory computer readable medium readable by machine, tangibly embodying a program of instructions executable by the machine for causing the machine to perform a method of restricting a first node in a broadcast domain of an IP (Internet Protocol) network from communicating with one or more other nodes, each of the first node and the one or more other nodes having a respective translation table that maps an IP address to a respective physical address of all nodes, with which the first node and the one or more other nodes communicated, the method comprising:

obtaining communicated data, said communicated data comprising address resolution messages;

accessing a virtual address resolution table, which is representative of an address resolution activity in the IP network;

responsive to said communicated data, indicating that the first node is communicating with other nodes, restricting said first node from communicating by generating and conveying a restricting address resolution message by using information stored in said virtual address resolution table wherein the information stored in said virtual address resolution table comprises information maintained respective of an operating system running on each corresponding node of the IP network, said restricting address resolution message comprising a substitute physical address; and updating information stored in the virtual address resolution table so as to represent changes to the information stored in the translation tables respective of the first node and the one or more other nodes.

26. A program storage device readable by machine, tangibly embodying a program of instructions executable by the machine to perform a method of maintaining a virtual address resolution table that is representative of an address resolution activity in a network, the method comprising:

obtaining communicated data that comprises an address resolution message, exchanged between a first node and one or more other nodes, each one of the first node and the one or more other nodes having a respective translation table that maps an IP (Internet Protocol) address to a respective physical address of all nodes, with which the first node and the one or more other nodes communicated; and updating information stored in said virtual address resolution table so as to represent changes to information stored in the translation tables respective of the first nodes and the one or more other nodes, wherein updating information stored in the virtual address resolution table comprises updating respective of an operating system running on each corresponding node over the IP network.

* * * * *